United States Patent
Madakasira Ramakrishna et al.

(10) Patent No.: US 12,165,035 B2
(45) Date of Patent: Dec. 10, 2024

(54) SYSTEMS AND METHODS FOR RESPONDING TO PREDICTED EVENTS IN TIME-SERIES DATA USING SYNTHETIC PROFILES CREATED BY ARTIFICIAL INTELLIGENCE MODELS TRAINED ON NON-HOMOGONOUS TIME-SERIES DATA

(71) Applicant: Citibank, N.A., New York, NY (US)

(72) Inventors: Prasanth Babu Madakasira Ramakrishna, New York, NY (US); Girish Wali, New York, NY (US); Deepali Tuteja, New York, NY (US); Ernst Wilhelm Spannhake, II, Canal Winchester, OH (US); Thomas Gianelle, Colleyville, TX (US); Milan Shah, Plano, TX (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/418,201

(22) Filed: Jan. 19, 2024

(65) Prior Publication Data
US 2024/0193401 A1  Jun. 13, 2024

Related U.S. Application Data

(63) Continuation-in-part of application No. 18/354,569, filed on Jul. 18, 2023, which is a continuation-in-part
(Continued)

(51) Int. Cl.
*G06N 3/045* (2023.01)
*G06N 3/088* (2023.01)

(52) U.S. Cl.
CPC ............. *G06N 3/045* (2023.01); *G06N 3/088* (2013.01)

(58) Field of Classification Search
CPC ......... G06F 16/24568; G06F 16/24556; G06F 16/2477; G06F 16/248; G06F 18/2415;
(Continued)

(56) References Cited

U.S. PATENT DOCUMENTS 11,164,125 B2   11/2021   Pandey et al.
11,704,540 B1 *   7/2023   Gianelle ................ G06N 3/084
                                                        706/21

(Continued)

FOREIGN PATENT DOCUMENTS

JP   09-204476 A   8/1997
KR   10-2340258 B1   12/2021

OTHER PUBLICATIONS

Hippenstiel, Ralph, Hassan El-Kishky, and Penio Radev. "On time-series analysis and signal classification-part I: fractal dimensions." Conference Record of the Thirty-Eighth Asilomar Conference on Signals, Systems and Computers, 2004 . . . vol. 2. IEEE, 2004: 2121-2125 (Year: 2004).*

(Continued)

*Primary Examiner* — Randall K. Baldwin
(74) *Attorney, Agent, or Firm* — Perkins Coie LLP

(57) ABSTRACT

The systems and methods may use one or more artificial intelligence models that predict an effect of a predicted event on a current state of the system. For example, the model may predict how a rate of change in time-series data may be altered throughout the first time period based on the predicted event. In addition, the system may use a machine learning model to classify a user, based on current state characteristics, into a class of users and identify peers of the user. Based on those peers, the system may identify items for the user and generate a predetermined output variable.

20 Claims, 11 Drawing Sheets

Related U.S. Application Data of application No. 18/174,498, filed on Feb. 24, 2023, now Pat. No. 11,868,860, which is a continuation-in-part of application No. 18/065,441, filed on Dec. 13, 2022, now Pat. No. 11,704,540.

(58) Field of Classification Search
CPC .... G06F 18/2321; G06N 3/04; G06N 3/0464; G06N 3/045; G06N 3/088; G06N 3/08; G06N 3/0635; G06N 3/084; G06N 3/105; G06N 3/00; G06N 3/063; G06K 9/66; G06K 9/6268; H03K 19/0944
See application file for complete search history.

(56) References Cited

U.S. PATENT DOCUMENTS

| | | | | |
|---|---|---|---|---|
| 11,868,860 | B1* | 1/2024 | Spannhake | G06N 20/00 |
| 2014/0258254 | A1* | 9/2014 | Suleiman | G06F 16/34 707/703 |
| 2019/0171459 | A1* | 6/2019 | Nakagawa | G06F 11/3072 |
| 2020/0012902 | A1* | 1/2020 | Walters | H04L 63/1491 |
| 2020/0334635 | A1* | 10/2020 | Busey | G06Q 30/0633 |
| 2021/0049700 | A1* | 2/2021 | Nguyen | G06N 3/08 |
| 2021/0248503 | A1* | 8/2021 | Hickey | G06F 18/2113 |
| 2021/0256378 | A1* | 8/2021 | Watt | G06N 3/044 |
| 2021/0397938 | A1* | 12/2021 | Tora | G06F 16/904 |
| 2022/0292308 | A1* | 9/2022 | Schwiep | G06F 18/213 |
| 2022/0335222 | A1* | 10/2022 | Le | H04L 67/1097 |
| 2022/0366494 | A1* | 11/2022 | Cella | H04L 9/50 |
| 2023/0065870 | A1* | 3/2023 | Pyzow | G06N 3/10 |
| 2023/0101182 | A1* | 3/2023 | Liao | G06F 18/22 706/12 |
| 2023/0164035 | A1 | 5/2023 | Nagar et al. | |
| 2023/0206329 | A1 | 6/2023 | Cella et al. | |
| 2023/0306284 | A1 | 9/2023 | Tappin | |

OTHER PUBLICATIONS

Lu, Weining, et al. "Unsupervised sequential outlier detection with deep architectures." IEEE transactions on image processing 26.9 (2017): 4321-4330. (Year: 2017).*

Vargas, Manuel R., et al. "Deep learning for stock market prediction using technical indicators and financial news articles." 2018 international joint conference on neural networks (IJCNN). IEEE, 2018. (Year: 2018).*

Sezer, Omer Berat, and Ahmet Murat Ozbayoglu. "Algorithmic financial trading with deep convolutional neural networks: Time series to image conversion approach." Applied Soft Computing 70 (2018): 525-538. (Year: 2018).*

Sezer, Omer Berat, and Ahmet Murat Ozbayoglu. "Financial trading model with stock bar chart image time series with deep convolutional neural networks." arXiv preprint arXiv:1903.04610 (2019): 1-15 (Year: 2019).*

Tovar, Wilfredo. "Deep Learning Based on Generative Adversarial and Convolutional Neural Networks for Financial Time Series Predictions." arXiv preprint arXiv:2008.08041 (2020). (Year: 2020).*

Sridhar, Sashank, and Sowmya Sanagavarapu. "Effect of Rate of Change of Stock Prices with News Sentiment Analysis." 2021 18th International Conference on Electrical Engineering, Computing Science and Automatic Control (CCE). IEEE, 2021. (Year: 2021).*

Rimal, Binod. Financial Time-Series Analysis with Deep Neural Networks. Diss. Florida Atlantic University, Aug. 2022: i-139 (Year: 2022).*

Final Office Action issued in corresponding U.S. Appl. No. 18/354,569 on Feb. 26, 2024 (79 pages).

Aleksandr Pletnev et al., "Graph Neural Networks for Model Recommendation using Time Series Data," 2020 19th IEEE International Conference on Machine Learning and Applications (ICMLA), IEEE 2020 (Year: 2020).

Notice of Allowance issued in corresponding U.S. Appl. No. 18/327,850 on Feb. 15, 2024 (13 pages).

Xiaozhe Wang et al., "Characteristic-based clustering for time series data," Data mining and knowledge Discovery 13 (2006): 335-364.

Nalabala et al., "Financial Predictions based on fussion models—a systematic review," 2021 International Conference on Emerging Smart Computing and Informatics (ESCI), IEEE, 2021: 28-37 (Year: 2021).

Liu et al., "Unsupervised Deep Learning for IoT Time Series," arXiv preprint arXiv:2302.03284 (Feb. 21, 2023): 1-22.

International Search Report and Written Opinion issued in corresponding International Application No. PCT/US2023/083609 on Apr. 17, 2024 (9 pages).

* cited by examiner

FIG. 1A

SYSTEMS AND METHODS FOR RESPONDING TO PREDICTED EVENTS IN TIME-SERIES DATA USING SYNTHETIC PROFILES CREATED BY ARTIFICIAL INTELLIGENCE MODELS TRAINED ON NON-HOMOGONOUS TIME-SERIES DATA

CROSS-REFERENCE TO RELATED APPLICATIONS

This application is a continuation-in-part of U.S. Patent Application Pub. No. US 2024-0193165 A1 published Jun. 13, 2024, which is a continuation-in-part of U.S. Pat. No. 11,868,860 issued on Jan. 9, 2024, which is a continuation-in-part of U.S. Pat. No. 11,704,540 issued on Jul. 18, 2023. The content of the foregoing applications is incorporated herein in its entirety by reference.

This application is also related to U.S. Pat. No. 11,948,065, issued on Apr. 2, 2024, which is a continuation of U.S. Pat. No. 11,704,540 issued on Jul. 18, 2023. The content of the foregoing applications is incorporated herein in its entirety by reference.

BACKGROUND

Artificial intelligence, including, but not limited to, machine learning, deep learning, etc. (referred to collectively herein as artificial intelligence models, machine learning models, or simply models) has excited the imaginations of both industry enthusiastic as well as the public at large. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. Given these benefits, the imagined applications for this technology seem endless.

However, despite these benefits and despite the wide-ranging number of potential uses, practical implementations of artificial intelligence have been hindered by several technical problems. Artificial intelligence typically relies on training a model to make predictions and/or perform functions. Such training requires large amounts of high-quality data through which patterns may be detected. The process for obtaining this data and ensuring it is high-quality is often complex and time-consuming. Furthermore, as artificial intelligence is applied to new applications, there may not be any prior data or patterns (or at least those that are recorded) upon which to base training data.

In such data-sparse environments, one solution is to generate artificial data. While there are various techniques for doing so, generating artificial time-series data is particularly problematic as the temporal relationship between the data must be preserved. Because of this, the techniques for generating artificial time-series data are limited to the techniques that can preserve and/or mimic this relationship. One such approach may include distribution-based techniques for generating artificial data (e.g., using bootlegging, resampling, etc.). Distribution-based techniques aim to mimic (not duplicate) time-series data at its normal distributions. However, while distribution-based techniques may mimic the "average" data, distribution-based techniques are ill suited for generating outliers (e.g., events with significant impact) within the data. This is particularly problematic in applications in which the outliers are more important.

SUMMARY

Systems and methods are described herein for novel uses and/or improvements to artificial intelligence applications, specifically applications related to predicting events in time-series data. As one example, methods and systems are described herein for predicting events in time-series data and modifying one or more characteristics of a current state accordingly. For example, the systems and methods may detect significant events (e.g., identify and measure events that correspond to rates-of-change in time-series data beyond a contextually relevant common threshold). Based on these predictions, the system may provide recommendations for changes in current characteristics of the state that may mitigate or take advantage of the effects of these predicted events (e.g., provide recommended changes to current characteristics in order to mitigate predicted rates-of-change over a first time period in the first time-series data). Furthermore, these recommendations may be based on non-obvious positive and negative events that are time-based and contextually relevant to a given individual/entity.

To achieve these predictions, the systems and methods may use one or more artificial intelligence models that predict an effect and/or occurrence of a predicted event based on the current state of the system. For example, the model may predict how a rate of change in time-series data (e.g., representing a current growth trajectory of the state) may be altered throughout the first time period based on the predicted event. However, as noted above, correctly predicting the occurrence of these events (which may comprise outliers to the normal trajectory), and in particular characteristics about these events (e.g., when an event may occur, what may be a source of the event, what rate of change the event may cause, etc.) in data-sparse environments (including environments featuring data with low interpretability) and based on time-series data presents a technical challenge.

To overcome this technical challenge, the system may generate predictions based on non-homogenous data. The system may use a first data set to determine a trajectory of a current state. The system may then use a different data set to predict the occurrence of the outlier event. For example, the system may select a second data set (i.e., a non-homogenous data) comprising actual (i.e., not predicted) data thus creating a "synthetic profile." The actual data found in the synthetic profile may comprise historic time-series data in which the historic time-series data indicates historic rates-of-change over a given time period. Furthermore, the system may filter the historic data set that is used based on similarities between the current state characteristics and/or required future state characteristics of the first system at the end of the first time period. That is, the system may select a second data set from a plurality of historic data sets based on the second data set having certain characteristics (e.g., similar state characteristics at the beginning or ending of a selected time period, similar trajectories, similar user profiles of users upon which the state is based, etc.). The system may then analyze the second data set for potentially significant events (e.g., events corresponding to a rate-of-change beyond a threshold).

Notably, upon identifying potentially significant events, which may include its time and magnitude, the system combines this information along with the first data set to generate a first feature input. Furthermore, to alleviate issues, if any, resulting from the differences in the non-homogenous data, the information (e.g., time, magnitude, and/or other characteristics) about predicted events is normalized to correspond to the characteristics of the first data set. For example, if a predicted event occurs in the fifth year from the beginning of the second time period, the system normalizes the predicted event to occur in the fifth year from the beginning of the first time period (even if the first time period and the second time period began at different times). The first feature input is then submitted to an artificial intelligence model that is trained to predict first rates-of-change over a first time period. The previously identified predictions (e.g., corresponding to a predicted event and/or characteristics of the event) are then applied to first rates-of-change over the first time period to generate recommendations for responding to the predicted events (e.g., recommending to maintain a current state, recommending to modify a state in a particular manner, etc.).

For example, by training the artificial intelligence model on both the first and second data set, the system mitigates the problem with low amounts of high-quality data (e.g., the system maximizes the amount of training data available). Secondly, by using the actual data from the second data set (e.g., indicating past events), the system mitigates potential precision and accuracy issues in relying on an artificial intelligence model to predict outlier events to a trajectory of the time-series data and/or characteristics about the outlier events. Furthermore, the system may in some embodiments process numerous data sets to identify predicted events and average information about them. Finally, by combining the normalized predicted events data with the first data set, the system generates predictions based on the state of the first data set, but with predicted events occurring at the normalized time and having the normalized magnitude.

In some aspects, systems and methods for responding to predicted events in computer systems based on predicted events in time-series data using artificial intelligence models trained on non-homogeneous time-series data are described. For example, the system may receive a first data set comprising a current state characteristic for a first system state. The system may receive a required future state characteristic for the first system state. The system may select a second data set from a plurality of available datasets based on similarities between state characteristics for the second data set and the current state characteristic and the required future state characteristic, wherein the second data set comprises second rate-of-change data over a second time period. The system may compare the second rate-of-change data to a threshold rate of change to detect a rate-of-change event. The system may generate a normalized rate-of-change event by normalizing the rate-of-change event based on the first data set. The system may input the first data set into a first model to generate first rate-of-change data over a first time period for the first system state. The system may generate modified first rate-of-change data based on the normalized rate-of-change event. The system may generate for display, on a user interface, a recommendation based on the modified first rate-of-change data.

In some embodiments, the system may provide output variables to a user to enable the user to review current state versus a recommended state. In particular, the system may receive an entity data set that includes a plurality of current state characteristics for an entity. In some embodiments, the entity may be a digital representation of a user. The plurality of current state characteristics may include entity characteristics such as user demographics. For example, the system may receive user demographic data such as age, gender, income, and/or other suitable demographic information representing entity characteristics. In some embodiments, the system may receive item data corresponding to information on data products that the user has selected and is using.

In some embodiments, the system may use a machine learning model to classify the user (e.g., the digital representation of the user), based on current state characteristics, into a class of users. In particular, the system may determine, for the entity using the plurality of current state characteristics as input into a clustering machine learning model, an entity cluster within a plurality of entity clusters. The clustering machine learning model may have been trained to classify the entity based on an entity's current state characteristics, into the entity cluster of the plurality of entity clusters. Furthermore, each entity cluster within the plurality of entity clusters may be defined by a corresponding set of current state characteristics. For example, each entity may represent a user. Thus, the clustering machine learning model may classify a user based on the user's demographic and other data (e.g., age, gender, income, risk tolerance, etc.).

The clustering machine learning model may be trained using a training dataset. Thus, the system may receive a training dataset that includes a corresponding set of current state characteristics for a plurality of entities. Each set of current state characteristics may include the entity characteristics and item representations associated with each corresponding entity. The clustering machine learning model may then be trained, using the training dataset to classify a given entity based on a given entity's current state characteristics into a corresponding entity cluster of a plurality of entity clusters. In some embodiments, each entity cluster within the plurality of entity clusters may be defined by the corresponding set of current state characteristics.

In some embodiments, the system may identify peer entities for the entity dataset that is received. In particular, the system may identify, within the entity dataset, a plurality of entities associated with the entity cluster. Each entity within the plurality of entities may be associated with corresponding one or more items. In some embodiments, the identification may be a comparison of user with other users based on user demographics and users with similar demographic data may be identified as peers.

In some embodiments, the system may generate a dataset that stores item characteristics for items associated with peer entities of the received entity. That is, the system may, after identifying peers corresponding to a user whose data is received as part of entity data, determine items associated with those peer entities. In particular, the system may generate, for the entity cluster, an item characteristic dataset based on the corresponding one or more items associated with each entity. For example, the system may retrieve item characteristics (e.g., product characteristics) associated with products that peer users use, or which peer users invest in and add those characteristics to the dataset.

In some embodiments, based on the item characteristics associated with peer entities, the system may predict items for association with the entity. In particular, the system may determine, for the entity cluster using the item characteristic dataset as input into a profiling machine learning model, a plurality of items. The profiling machine learning model may have been trained to identify, for a given item characteristic set, a given plurality of items to be linked with a given entity cluster. For example, the system may input, in the profiling machine learning model, characteristics of products that peer users use and/or in which peer users have invested. The profiling machine learning model may output other products that are predicted to be preferred by the user.

In some embodiments, the profiling machine learning model may be trained by using the following operations. The system may add, to the training dataset (e.g., as described above), item characteristics associated with corresponding items to generate an updated training dataset. For example, the system may add for each item identifier (e.g., each product identifier that the user uses), item characteristics (e.g., product data) such as risk data, type, and/or other item characteristics. The system may then train, using the updated training dataset, the profiling machine learning model to identify, for the given item characteristic set, the given plurality of items to be linked with the given entity cluster.

The system may then determine, based on the set of item characteristics, a subset of items for the entity having a predetermined output variable. For example, select each item and perform a lookup for a corresponding predetermined output variable for each item. Based on those corresponding output variables, the system may select one or items with the corresponding output variables meeting a criterion (e.g., a highest three or highest two, etc.). For example, the output variables may be return data for a financial product.

In addition, the system may provide to a user an indication of the predetermined output variable and an entity variable corresponding to a current set of items. The predetermined output variable may be determined based on item data within the set of items and the entity variable is determined based on current item data within the current set of items. For example, the system may concatenate or add each predetermined output variable and each entity variable to arrive at the predetermined out variable and the entity variable.

In some embodiments, the system may provide to the user the indication as a synthetic profile. In particular, the system may generate a synthetic profile for the entity. The synthetic profile may include current state characteristics associated with the entity cluster. For example, the system may generate a sample user with user characteristics similar to those of the user. The system may then add, to the synthetic profile the set of items and a combination of variables associated with the set of items. For example, the system may add products that a sample user is predicted to use as well as data about those products. The system may then generate, for display on a client device, indications of the synthetic profile, the combination of variables, the current state characteristics of the entity, or a new entity variable associated with the current state characteristics of the entity.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

Figure 1A:
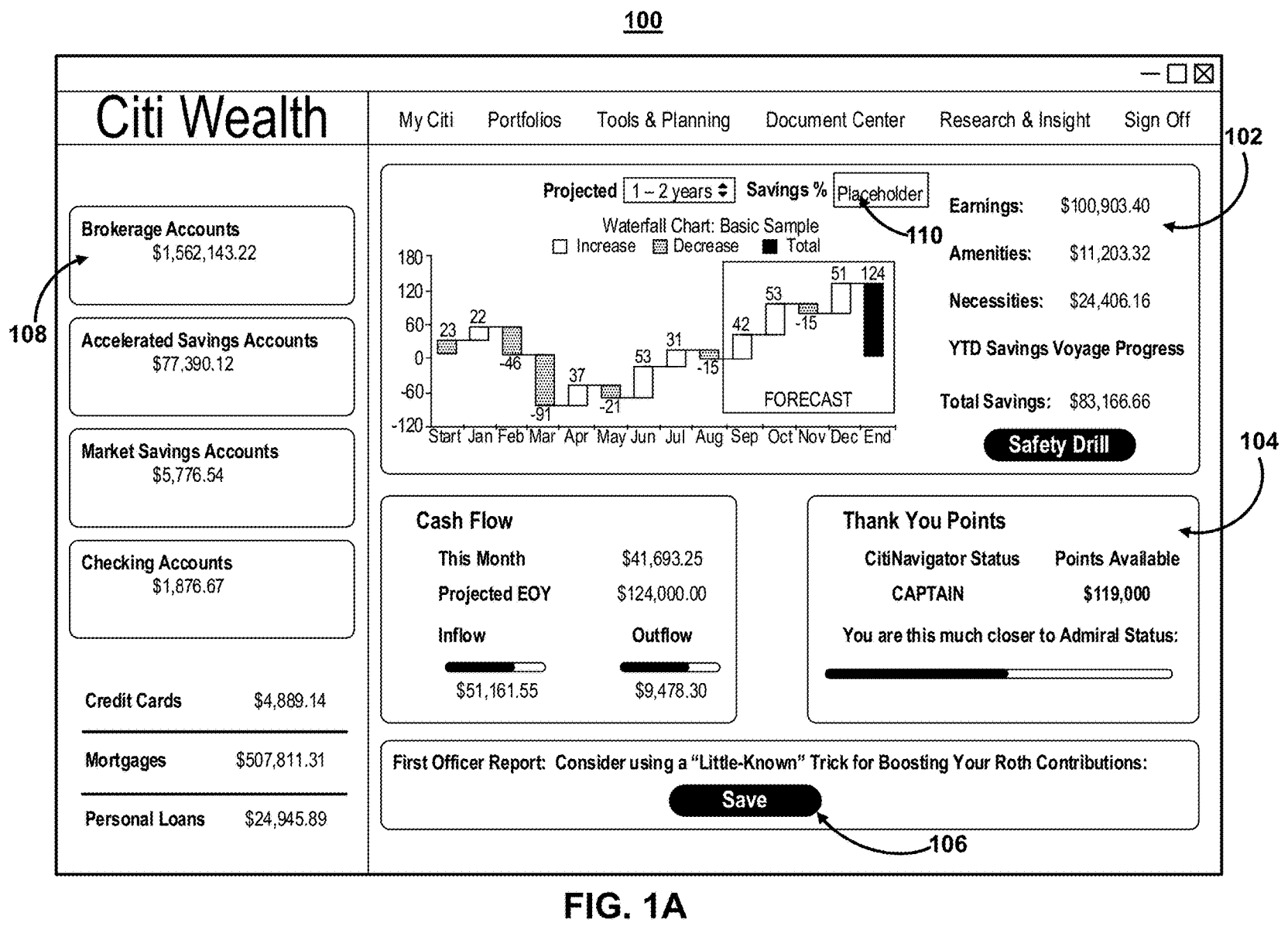

FIG. 1A shows an illustrative user interface comprising recommendations based on a synthetic profile, in accordance with one or more embodiments.

DETAILED DESCRIPTION OF THE DRAWINGS

Figure 1B:
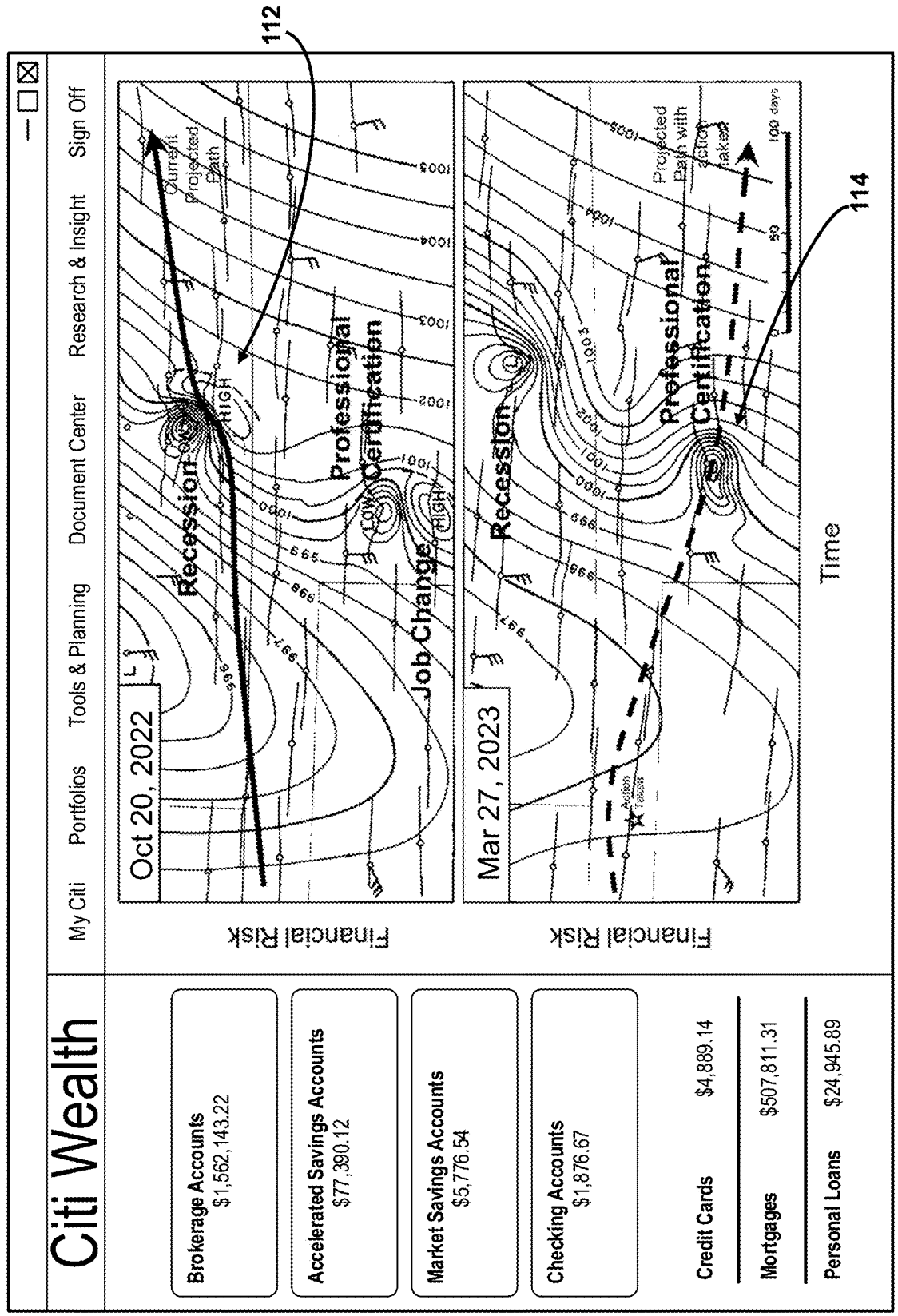
FIG. 1B shows another illustrative user interface comprising an isobaric graphical representation based on synthetic profile, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

FIG. 1A shows an illustrative user interface comprising recommendations based on a synthetic profile, in accordance with one or more embodiments. As referred to herein, a "user interface" may comprise a human-computer interaction and communication in a device, and may include display screens, keyboards, a mouse, and the appearance of a desktop. For example, a user interface may comprise a way a user interacts with an application or a website.

As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user generated content may include content created and/or consumed by a user. For example, user generated content may include content created by another, but consumed and/or published by the user.

In some embodiments, the content may comprise a client portal that provides recommendations based on one or more models. For example, the client portal may identify context relevant time-based observations and share these observations as recommendations (e.g., recommendation 102) with the client. The recommendations may provide a line of sight to the areas that clients may want to consider but were not aware they should be considering in an intermediate timeframe. For example, the clients have numerous options for planning major life events and the system (e.g., via user interface 100) may act as a conduit to allow client have control of the intermediate term and expose them to one or more features.

In some embodiments, the content may comprise awards that are achievable within certain timeframes to incent behavior in line with the client's unique objectives (e.g., recommendation 104). For example, by establishing a "status" level with various aspirational levels, the system may incentivize a client to increase use of the system. The system may also provide one or more recommendations that are interactive. These interactive recommendations may allow a user to enter data or save data (e.g., via icon 106).

In some embodiments, the system may monitor content generated by the user to generate user profile data such as user profile data 108. As referred to herein, "a user profile" and/or "user profile data" may comprise data actively and/or passively collected about a user. For example, the user profile data may comprise content generated by the user and a user characteristic for the user. A user profile may be content consumed and/or created by a user.

User profile data may also include a user characteristic. As referred to herein, "a user characteristic" may include about a user and/or information included in a directory of stored user settings, preferences, and information for the user. For example, a user profile may have the settings for the user's installed programs and operating system. In some embodiments, the user profile may be a visual display of personal data associated with a specific user, or a customized desktop environment. In some embodiments, the user profile may be digital representation of a person's identity. The data in the user profile may be generated based on the system actively or passively monitoring.

In some embodiments, a user characteristic may comprise a current state characteristic. For example, the system may receive current account information for a first user account (e.g., a "first system state") of an automated family office system. The current account information may include current holdings, positions, investments, etc., which may represent a "current state characteristic" for the account. Additionally, the current account information may include investment strategies, rates of return, etc. For example, user profile data 108 may comprise a current state characteristic.

In some embodiments, a user characteristic may comprise a required future state characteristic. For example, the "required future state characteristic" may comprise a given rate of return, a total value of the account, etc. for the user account. As shown in FIG. 1A, a required future state characteristic may comprise a required savings percentage (e.g., user profile data 110). For example, the system may receive a required future state characteristic for the first system state.

FIG. 1B shows another illustrative user interface comprising an isobaric graphical representation based on synthetic profile, in accordance with one or more embodiments. For example, in some embodiments, the system may display content in the form of a graphical representation (e.g., either static or dynamic). One such graphical representation may comprise an isobaric graph. In such cases, an outlier event may be represented by an identified pressure point. For example, the system may discern that a particular event or sequence of events results in either statistically significant positive or negative consequences.

For example, an outlier may be analogous to a pressure area on an isobaric chart. It is an area over time where there is a high likelihood that an extreme (high or low) value for the Y-axis unit of measure would be experienced. In one example, such as where the time-series data represents a financial projection, the outlier event may represent a windfall event or a personal or financial emergencies that negatively affects the financial projection. Based on detecting these events, the system may generate a recommendation to maintain a current trajectory of a predicted state or may recommend a change to the state.

Alternatively or additionally, the system may determine rate-of-change data over a time period. To do so, the system may analyze time-series data. As described herein, "time-series data" may include a sequence of data points that occur in successive order over some period of time. In some embodiments, time-series data may be contrasted with cross-sectional data, which captures a point-in-time. A time series can be taken on any variable that changes over time. The system may use a time series to track the variable (e.g., price) of an asset (e.g., security) over time. This can be tracked over the short term, such as the price of a security on the hour over the course of a business day, or the long term, such as the price of a security at close on the last day of every month over the course of five years. The system may generate a time series analysis. For example, a time series analysis may be useful to see how a given asset, security, or economic variable changes over time. It can also be used to examine how the changes associated with the chosen data point compare to shifts in other variables over the same time period. For example, with regards to stock portfolio performance, the system may receive time series data for the various sub-segments indicating daily values for individual stock returns.

In some embodiments, the system may apply one or more types of data conditioning to one or more data sets. For example, data visualization is an important step in analysis of a data set. Plotting large time-series data however generates large file sizes, which may slow down user interactions and strain computing resources. Accordingly, the system may condition data in a data set by applying a compression algorithm. For example, the system may receive a raw time-series data. The system may generate a data set by applying a compression algorithm to the raw time-series data.

The time-series analysis may determine various trends such as a secular trend, which describe the movement along the term, a seasonal variation, which represent seasonal changes, cyclical fluctuations, which correspond to periodical but not seasonal variations, and irregular variations, which are other nonrandom sources of variations of series. The system may maintain correlations for this data during modeling. In particular, the system may maintain correlations through non-normalization as normalizing data inherently changes the underlying data which may render correlations, if any, undetectable and/or lead to the detect of false positive correlations. For example, modeling techniques (and the predictions generated by them), such as rarefying (e.g., resampling as if each sample has the same total counts), total sum scaling (e.g., dividing counts by the sequencing depth), and others, and the performance of some strongly parametric approaches, depends heavily on the normalization choices. Thus, normalization may lead to lower model performance and more model errors.

As such, the system may not rely on a model and data from a first data set (e.g., from a first user) to predict the occurrence of the outlier event. That is, the system does not rely on a model to detect outlier events. Instead, the system may select a second data set (i.e., a non-homogenous data) comprising actual (i.e., not predicted) data, creating a "synthetic profile." The actual data found in the synthetic profile may comprise second time-series data in which the second time-series data indicates second rates-of-change over a second time period. The system may select the second data set (or a plurality of data sets) based on similarities between the current state characteristics and/or required future state characteristics of the first system at the end of the first time period. The system may then analyze the second data set for predicted events (e.g., events corresponding to a rate-of-change beyond a threshold).

For example, the system may comprise a cohort prediction modeling system. The cohort prediction modeling system may identify similar sets of data to that of a user. By doing so, the system may evaluate similar multi-variate time-series data to correlate relationships between events or trends and likely outcomes. The data sets may comprise multiple sets of data and/or data collection means. For example, the system may use an array of real-time event, batch data, collected and conditioned data from a wide variety of structured and unstructured data sources to define the cohorts and capture client specific targeted local, regional and national data.

In some embodiments, the system conditions individual data sets identifying time-based rates of change. Using ensemble methods, the system combines conditioned data to detect outliers (non-obvious contextual time-based pressure events) creating a "synthetic model". The "synthetic model" outliers are weighted to compare current state characteristics to future state contextual relevant time-based characteristics allowing for course disruptions (edge path selection) to be identified.

As referred to herein, a "cohort" may comprise a one or more other users. Data related to the cohort may be used to generate a synthetic profile. The system may select the cohort based on similarities between user profile data of a first user and the user profile data of the one or more other users. For example, the system may compare current state characteristics and/or required future state characteristics (e.g., at the end of the first time period) of the first system (e.g., of a first user) to the state characteristics over a time period corresponding to the first time period.

For example, the system may determine a current state characteristic of a first user (e.g., a first account balance) and a required future state characteristic (e.g., an account balance of the first account after five years). The system may then find other users that have historical data showing an initial account balance corresponding to the first account balance and then a final account balance after five years that corresponds to the required future state characteristic. Upon determining that the one or more other users are part of the first user's cohort, the system may retrieve user profile data for the one or more other users. The user profile data of the one or more users may become a second data set upon which a synthetic profile is generated. In some embodiments, the system may collect and condition data to allow a model to "train" itself (e.g., as further described in FIGS. 3A-3B below), finding correlations and defining cohorts.

In some embodiments, a cohort may comprise a set that consists of the entities that experienced the data being captured and analyzed. Cohorts may share common attributes that cause them to be selected as members of the set. The system may analyze the cohort data to discern patterns that lead to predicted outcomes. The cohort data may comprise numerous data streams are with many units of measures. The system may then segregate the data streams by cohort.

Upon identifying predicted events (e.g., including both its time and magnitude) such as pressure point 112 and pressure point 114, the system combines this information along with the first data set to generate a first feature input. Furthermore, the information about predicted events is normalized to begin at a time corresponding to the first data set. That is, if the predicted event occurs in the fifth year of the second time period, the system normalizes the predicted event to occur in the fifth year of the first time period (even though the predicted event is actually years in the past). The first feature input is then submitted to an artificial intelligence model that is trained to predict first rates-of-change over a first time period. The previously identified predictions (e.g., corresponding to a predicted event and/or characteristics of the predicted events) are then applied to first rates-of-change over the first time period to generate recommendations for responding to predicted events.

For example, a predicted event, outlier event, and/or pressure point (e.g., pressure point 112 and pressure point 114) may comprise events or situations that present a current or future risk. For example, a predicted event, outlier event, and/or pressure point may be the breaching of a value on the Y-axis unit of measure, where a boundary threshold has been calculated as the upper of lower limit at a given point in time. The system may detect pressure points of interest as ones presented to the client that have a reasonable likelihood of occurring based on the experiences of others in the cohort. The system may also determine degrees of probability of the likelihood of a user navigating (e.g., based on user profile data) into a pressure point, based on the client's trajectory, which is influenced by the client's user profile data, positions, cohort, and/or internal and external state characteristics.

Each pressure points have varying degrees of impact, either positive or negative. As such, the system may determine both the likelihood of a pressure point as well as its time and/or magnitude. The system may express this impact by the pressure point's position on the Y axis of the isobar map.

As referred to herein, "a data set" may refer to data that is received from a data source that is indexed or archived by time. This may include streaming data (e.g., as found in streaming media files) or may refer to data that is received from one or more sources over time (e.g., either continuously or in a sporadic nature). A data set may indicate a state of the data set at a given time period. For example, a state or instance may refer to a current set of data corresponding to a given time increment or index value. For example, the system may receive time series data as a data set. A given increment (or instance) of the time series data may correspond to a state of the data set.

In some embodiments, the system may time-shift data in order to normalize the data. For example, in order to compare a second data set to a first data set, the system may time shift the data so that the historic data is applied in an appropriate and consistent manner. As one example, if a current state characteristic and a required future state characteristic are five years apart, the system may select data based on identifying a corresponding initial state characteristic and then determining whether data corresponding to five years later corresponds to the required future state characteristic.

In some embodiments, the system may apply additional normalization to account for the effect of time-shifting. For example, in some embodiments, the analysis of time-series data presents comparison challenges that are exacerbated by normalization. For example, a comparison of data from the same period in each year does not completely remove all seasonal effects. Certain holidays such as Easter and Chinese New Year fall in different periods in each year, hence they will distort observations. Also, year-to-year values will be biased by any changes in seasonal patterns that occur over time. For example, consider a comparison between two consecutive March months (i.e., compare the level of the original series observed in March for 2000 and 2001). This comparison ignores the moving holiday effect of Easter. Easter occurs in April for most years but if Easter falls in March, the level of activity can vary greatly for that month for some series. This distorts the original estimates. A comparison of these two months will not reflect the underlying pattern of the data. The comparison also ignores trading day effects. If the two consecutive months of March have different composition of trading days, it might reflect different levels of activity in original terms even though the underlying level of activity is unchanged. In a similar way, any changes to seasonal patterns might also be ignored. The original estimates also contain the influence of the irregular component. If the magnitude of the irregular component of a series is strong compared with the magnitude of the trend component, the underlying direction of the series can be distorted. While data may in some cases be normalized to account for this issue, the normalization of one data stream set may affect another data stream set.

In some embodiments, the system may normalize the rate-of-change event by time-shifting a time of the rate-of-change event during the second time period to correspond to a time during the first time period. For example, the system may determine a first start time corresponding to the first time period. The system may determine a second start time corresponding to the second time period. The system may determine a difference between the second start time and a time of the rate-of-change event. The system may apply the difference to the first start time to determine a predicted time of the rate-of-change event during the first time period.

Figure 1C:
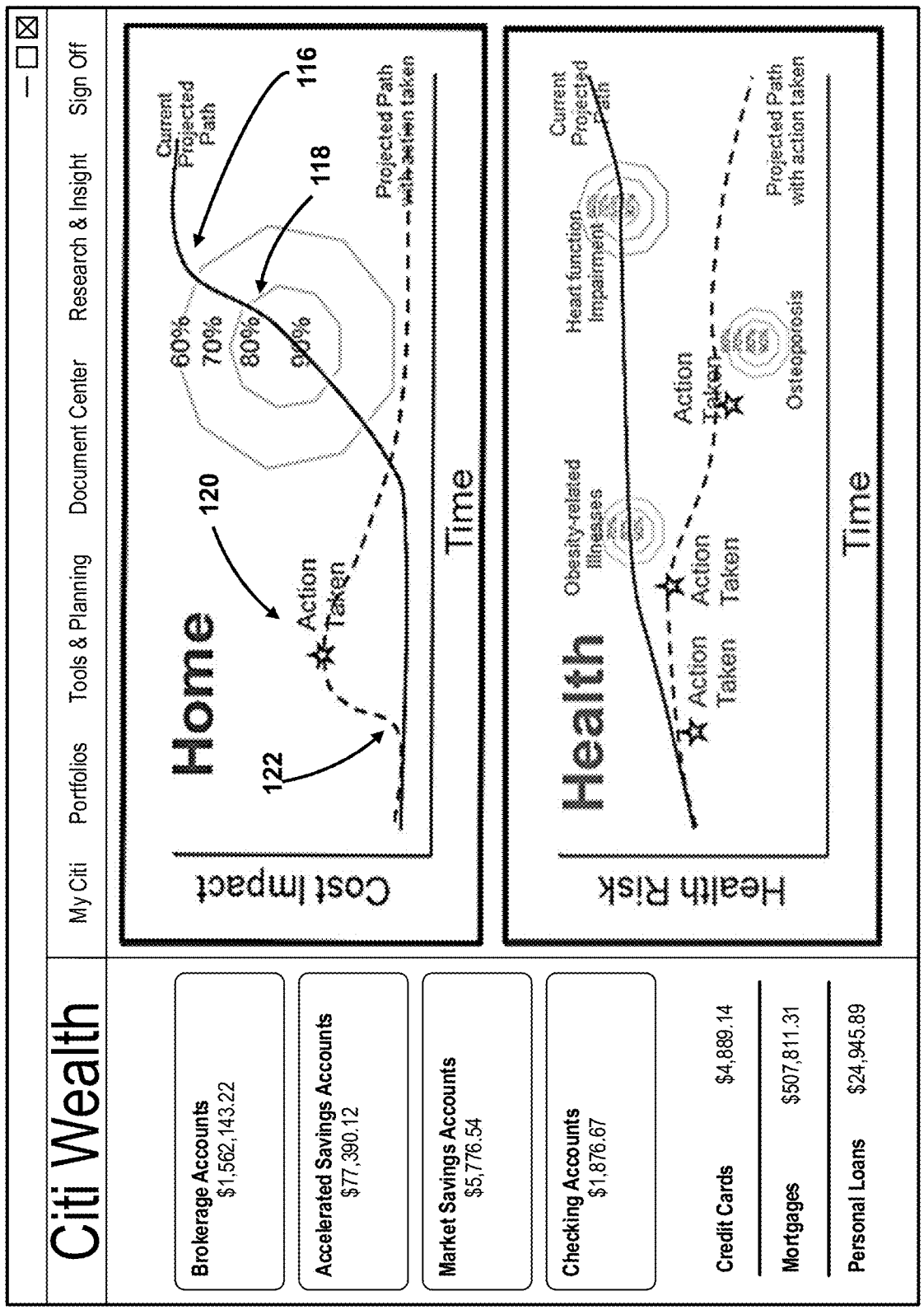
FIG. 1C shows an illustrative user interface comprising a recommendation based on an isobaric graphical representation, in accordance with one or more embodiments.

FIG. 1C shows an illustrative user interface comprising a recommendation based on an isobaric graphical representation, in accordance with one or more embodiments. For example, the system may generate path projections are on the first user profile data and/or any other current state data to generate multiple dimension representations of state characteristics (e.g., risk, health, financials, etc.) to determine if a path projection intersects a with an outlier event (e.g., a pressure point) or diverges from a desired path. The system may then provide recommendations to adjust course and subsequent actions tracked.

For example, as shown in FIG. 1C, the system has determined path projection 116 that include pressure point 118. For example, the system may select a second data set from a plurality of available datasets based on similarities between state characteristics for the second data set and the current state characteristic and the required future state characteristic, wherein the second data set comprises second rate-of-change data over a second time period. That is, the system may select a second data set based on a cohort of a user.

In some embodiments, the system may use an artificial intelligence model to select a cohort of the user. For example, the system may use a model to select a cohort of the user and then select a data set corresponding to the selected cohort. For example, the system may receive historical time-series data. The system may train a second model using unsupervised learning, wherein the second model comprises a convolutional neural network. The system may select the second data set from the plurality of available datasets using the second model.

The system may compare the second rate-of-change data to a threshold rate of change to detect a rate-of-change event. This rate-of-change event may comprise an outlier event (e.g., pressure point 118) as this rate-of-change event comprises a point at which a rate-of-change equaled or exceeded a threshold rate-of-change. In response to determining path projection 116 and pressure point 118, the system may provide recommendation 120 and generate path projection 122. Path projection 122 may represent a result of accepting recommendation 120.

For example, the system may project, based on cohort experience and event likelihood correlation, that an intersection will occur with a pressure point and the current trajectory. In some embodiments, the system may provide multiple selectable actions to the user that the user can use to alter path projections. For example, the system may deliver a path projection visualization of the likely outcome of the selected actions. The system may then track the actions to further enhance the model's learning. As such, the system may generate a display of the calculated projection and provide the ability to render the end-to-end path and produce a visualization of the user's path over time as it nears a pressure point. The system may also compare the initial projection to the actual course to improve learning.

In some embodiments, the system may use an artificial intelligence model to determine an effect of a rate-of-change event on a state of a system (e.g., a path projection). For example, the system may use a model to determine whether a detected pressure point may have a positive or negative adjustment on a projected path of the time-series data for the first user. For example, the system may receive historical time-series data. The system may train the first model using unsupervised learning, wherein the first model comprises a convolutional neural network. The system may select the recommendation from a plurality of recommendations based on an output of the first model.

Additionally or alternatively, the system may generate modified first rate-of-change data based on the normalized rate-of-change event. For example, the modified first rate-of-change data may predict the change in a user's account over a time period after applying disruptive events. For example, the system may detect whether pressure points can be avoided, by taking actions, adjusting behaviors, etc. The system may recognize the underlying causes of pressure points by analyzing the experiences of the cohort. Upon determining the cause, the system may recommend actions to influence the client's path. In some embodiments, the actions may require action and may have cost. The cost or "sacrifice" may be expressed by the system on the recommended paths movement on the Y axis of the isobar map.

Figure 1D:
FIG. 1D shows an illustrative user interface comprising recommendations based on a synthetic profile, in accordance with one or more embodiments.

FIG. 1D shows an illustrative user interface comprising recommendations based on a synthetic profile, in accordance with one or more embodiments. For example, FIG. 1D shows an illustrative recommendation that may appear on a mobile user device. In some embodiments, the system may generate recommendations in a dynamic manner. For example, the system may generate one or more recommendations in response to one or more detected triggering events.

In some embodiments, a triggering event may comprise user profile data updates that may affect a state of a system. For example, the system may detect that a user is about to make a large purchase that may cause a path projection based on the resulting state of the system (e.g., a user account of the user) to be positively or negatively affected (or cause a rate-of-change event to equal or exceed a threshold rate-of-change. In response, the system may generate a recommendation (e.g., recommendation 152) on user interface 150.

Figure 2:
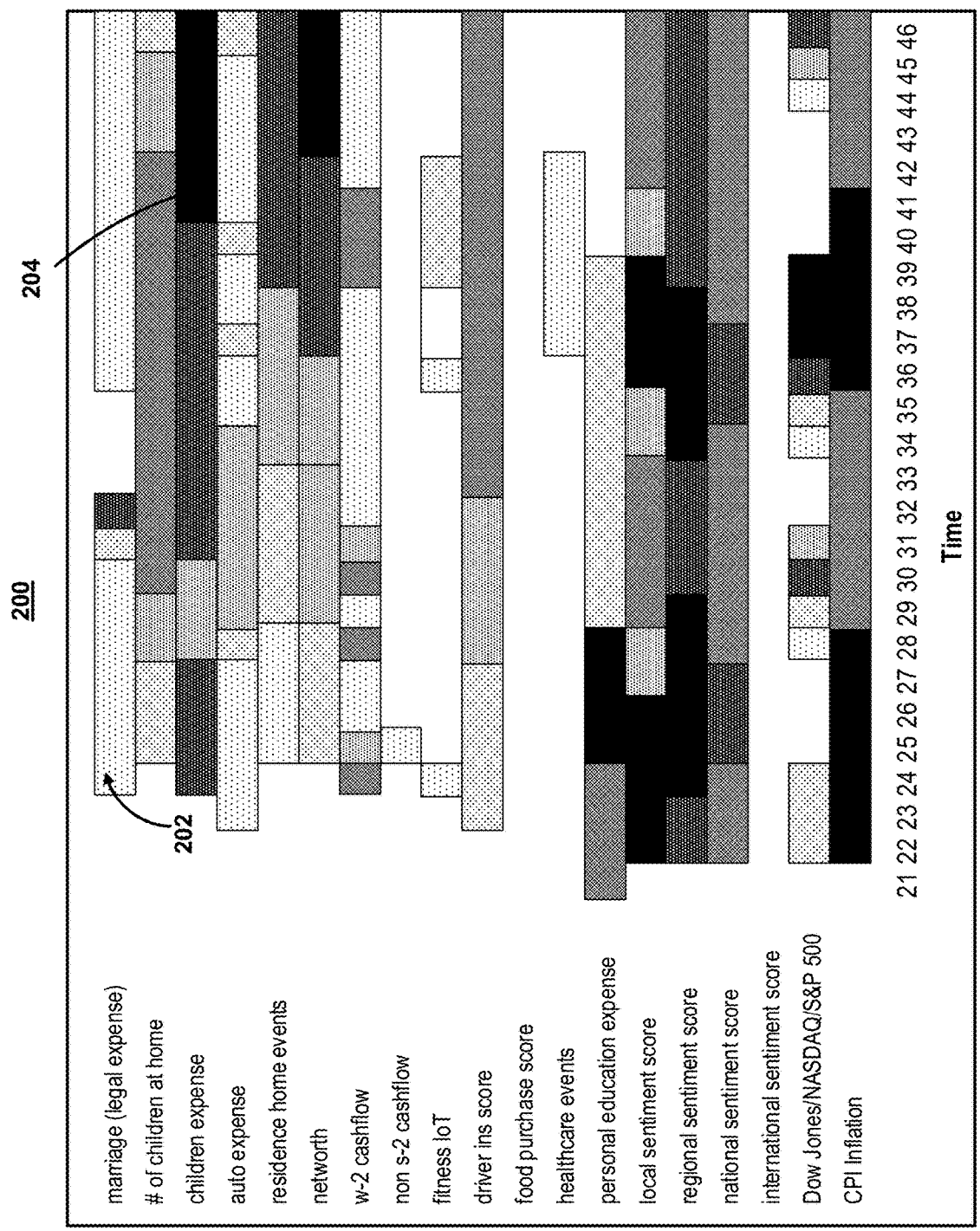
FIG. 2 shows an illustrative diagram comprising predicted rates-of-change over a time period, in accordance with one or more embodiments.

FIG. 2 shows an illustrative diagram comprising predicted rates-of-change over a time period, in accordance with one or more embodiments. For example, FIG. 2 includes diagram 200, which may indicate a likelihood of a given predicted event or outlier event based on a given characteristic. Diagram 200 indicates a likely time period and/or magnitude of a given predicted event or outlier event. For example, diagram 200 represents data that may be used to generate one or more pressure points (e.g., pressure point 112 (FIG. 1B) and pressure point 114 (FIG. 1B)). In some embodiments, diagram 200 may represent a data set corresponding to a given cohort. For example, the synthetic profile may be used to display events across time in the second data set.

In some embodiments, diagram 200 may indicate one or more edge conditions. Edge Conditions may comprise data points where the system has been determined that a strong correlation exists between two or more other data points. As shown on the Y axis of diagram 200, various data points (e.g., categories of events) have been determined by the system to correlate to a rate-of-change event both in terms of a likely time and magnitude. For example, point 202 indicates a low magnitude/likelihood of an outlier event (e.g., a pressure point) at time "22" (e.g., corresponding to a user age of twenty-two) and an outlier event with a large magnitude (e.g., indicating a low likelihood of a user marrying at that time and/or such an outlier event having a large effect on a rate-of-change of the state of the system). In contrast, point 204 indicates a high magnitude/likelihood of an outlier event (e.g., a pressure point) at time "42" (e.g., corresponding to a user age of forty-two) and an outlier event with a large magnitude (e.g., indicating a high likelihood of a user having a child expense at that time and/or such an outlier event having a large effect on a rate-of-change of the state of the system).

As shown in diagram 200, there are both "negative" and "positive" edge conditions that may have positive or negative effects on a rate-of-change of the state of the system. In some embodiments, the system may determine an edge condition and/or its effect. Based on its effect (e.g., magnitude), the system may select a threshold rate. Additionally or alternatively, the system may determine whether or not a user may be effected by an edge conditions based on user profile data. For example, the system may determine whether or not a user is likely to approach an age and/or may otherwise likely be affected by an edge condition. For example, the system may determine based on data about the user that the user is likely to experience an event of a given type. For example, the system may retrieve user profile data. The system may determine the event type based on the user profile data. To detect the edge conditions, the system may compare the second rate-of-change data to a threshold rate of change. For example, the system may detect predicted events in the system state based on large changes in the rate-or-change of the user account. These large charges may correspond to external events such as a marriage, death, divorce, market downturn, etc.

Figure 3A:
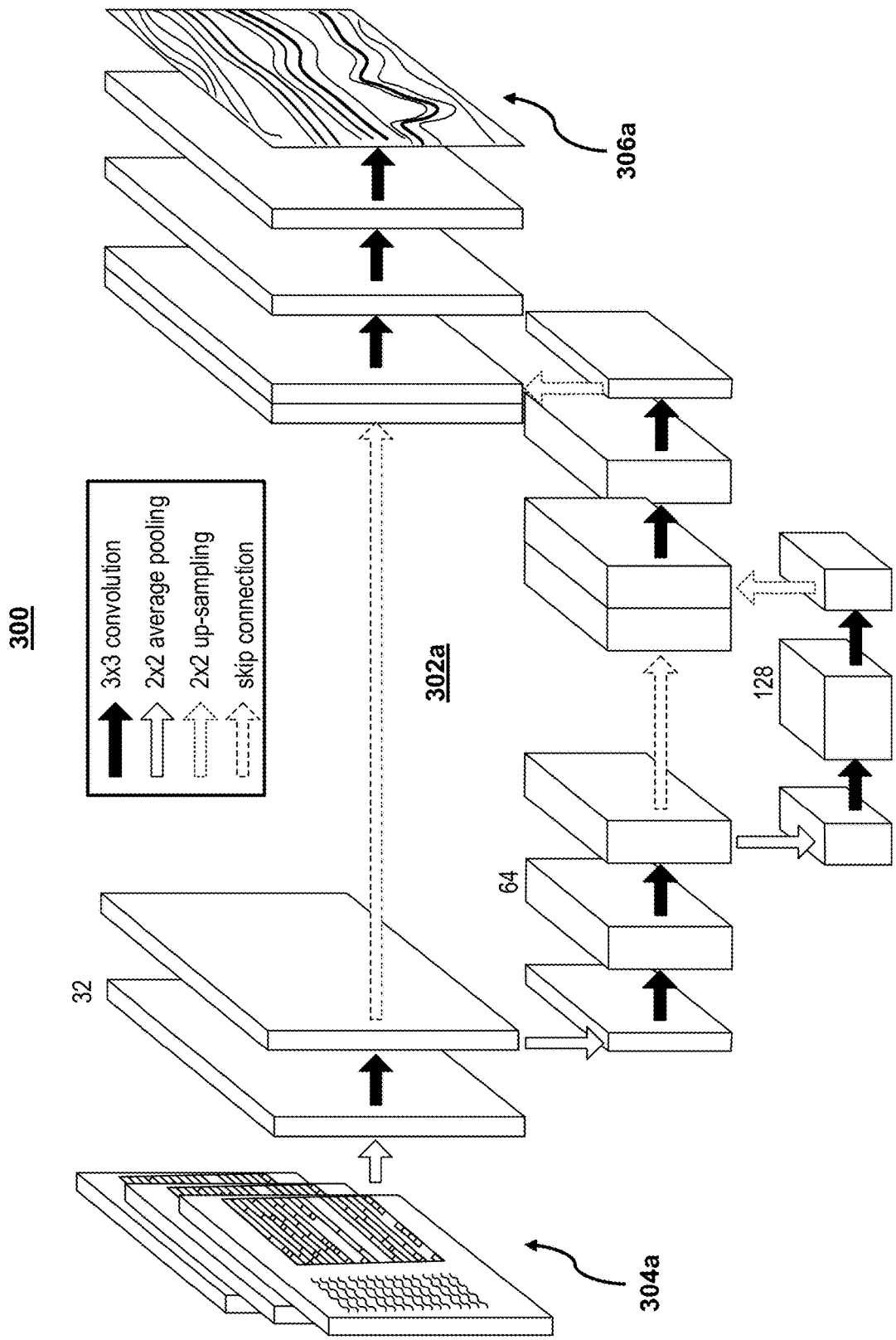
FIGS. 3A-3B show illustrative models for a system used to generate recommendations based on a synthetic profile, in accordance with one or more embodiments.
Figure 3B:
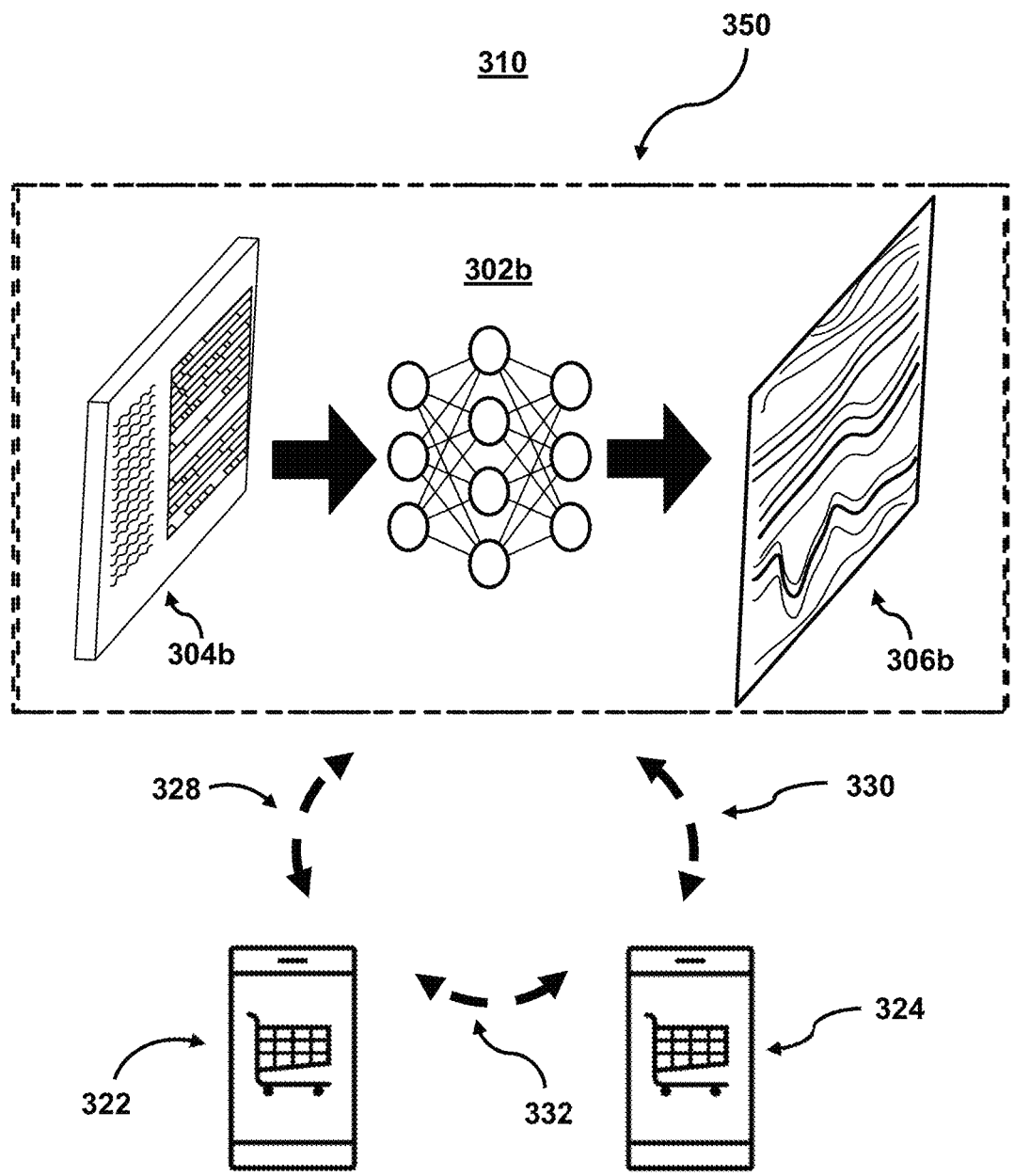

FIGS. 3A-3B show illustrative models for a system used to generate recommendations based on a synthetic profile, in accordance with one or more embodiments. For example, FIG. 3A includes system 300. System 300 includes model 302a, which may be a machine learning model, artificial intelligence model, etc. (which may be referred collectively as "models" herein). Model 302a may take inputs 304a and provide outputs 306a. The inputs may include multiple datasets, such as a training dataset and a test dataset. Each of the plurality of datasets (e.g., inputs 304a) may include data subsets related to user data, predicted forecasts and/or errors, and/or actual forecasts and/or errors. In some embodiments, outputs 306a may be fed back to model 302a as input to train model 302 (e.g., alone or in conjunction with user indications of the accuracy of outputs 306a, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., select a second data set from a plurality of available datasets based on similarities between state characteristics for the second data set and the current state characteristic and the required future state characteristic).

In a variety of embodiments, model 302a may update its configurations (e.g., weights, biases, or other parameters) based on the assessment of its prediction (e.g., outputs 306a) and reference feedback information (e.g., user indication of accuracy, reference labels, or other information). In a variety of embodiments, where model 302a is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302a may be trained to generate better predictions.

In some embodiments, the model (e.g., model 302a) may automatically perform actions based on outputs 306. In some embodiments, the model (e.g., model 302a) may not perform any actions. The output of the model (e.g., model 302a) may be used to select a second data set from a plurality of available datasets based on similarities between state characteristics for the second data set and the current state characteristic and the required future state characteristic.

Model 302a is shown as a convolutional neural network. A convolutional neural network consists of an input layer (e.g., input 304a), hidden layers, and an output layer (e.g., output 306a). As shown in FIG. 3A, the middle layers are called hidden because their inputs and outputs are masked by the activation function and final convolution (e.g., convolutions of 32, 64, and 128). For example, each convolution may comprise an array of weights, which represents part of the input. While each may vary in size, the filter size may comprise a matrix that determines the size of the receptive field. The filter is then applied to an area of the input, and a dot product is calculated between the input pixels and the filter. This dot product is then fed into an output array.

In a convolutional neural network, the hidden layers include layers that perform convolutions. Model 302a may comprise convolutional layers that convolve the input and pass its result to the next layer. Model 302a may also include local and/or global pooling layers along with traditional convolutional layers. Pooling layers reduce the dimensions of data by combining the outputs of neuron clusters at one layer into a single neuron in the next layer. Also as shown, model 302a may comprise fully connected layers that connect every neuron in one layer to every neuron in another layer.

FIG. 3B includes system 310. As shown in FIG. 3B, in some embodiments, system 310 may comprise one or more components of system 300 (FIG. 3A). For example, system 310 may comprise model 302b, which may have been trained by taking inputs 304b and provide outputs 306b. Model 302b may include an artificial neural network. In such embodiments, model 302b may include an input layer and one or more hidden layers. Each neural unit of model 302b may be connected with many other neural units of model 302b. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302b may be self-learning and trained, rather than explicitly programmed, and can perform significantly better in certain areas of problem solving, as compared to traditional computer programs. During training, an output layer of model 302 may correspond to a classification of model 302b, and an input known to correspond to that classification may be input into an input layer of model 302b during training. During testing, an input without a known classification may be input into the input layer, and a determined classification may be output.

In some embodiments, model 302b may include multiple layers (e.g., where a signal path traverses from front layers to back layers). In some embodiments, back propagation techniques may be utilized by model 302b where forward stimulation is used to reset weights on the "front" neural units. In some embodiments, stimulation and inhibition for model 302 may be more free-flowing, with connections interacting in a more chaotic and complex fashion. During testing, an output layer of model 302b may indicate whether or not a given input corresponds to a classification of model 302b (e.g., select a second data set from a plurality of available datasets based on similarities between state characteristics for the second data set and the current state characteristic and the required future state characteristic).

FIG. 3B also illustrates components for generate recommendations based on a synthetic profile. As shown in FIG. 3B, system 310 may include mobile device 322 and mobile device 324. While shown as a smartphone, respectively, in FIG. 3, it should be noted that mobile device 322 and mobile device 324 may be any computing device, including, but not limited to, a laptop computer, a tablet computer, a hand-held computer, and other computer equipment (e.g., a server), including "smart," wireless, wearable, and/or mobile devices. System 300 may also include cloud components. For example, cloud components may be implemented as a cloud computing system and may feature one or more component devices. It should be noted, that, while one or more operations are described herein as being performed by particular components of system 310, these operations may, in some embodiments, be performed by other components of system 310. As an example, while one or more operations are described herein as being performed by components of mobile device 322, these operations may, in some embodiments, be performed by cloud components. In some embodiments, the various computers and systems described herein may include one or more computing devices that are programmed to perform the described functions. Additionally, or alternatively, multiple users may interact with system 310 and/or one or more components of system 310.

With respect to the components of mobile device 322 and mobile device 324, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and mobile device 324 include a display upon which to display data.

Additionally, as mobile device 322 and mobile device 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 310 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3B also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 300 also includes API layer 350. API layer 350 may allow the system to generate summaries across different devices. In some embodiments, API layer 350 may be implemented on user device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
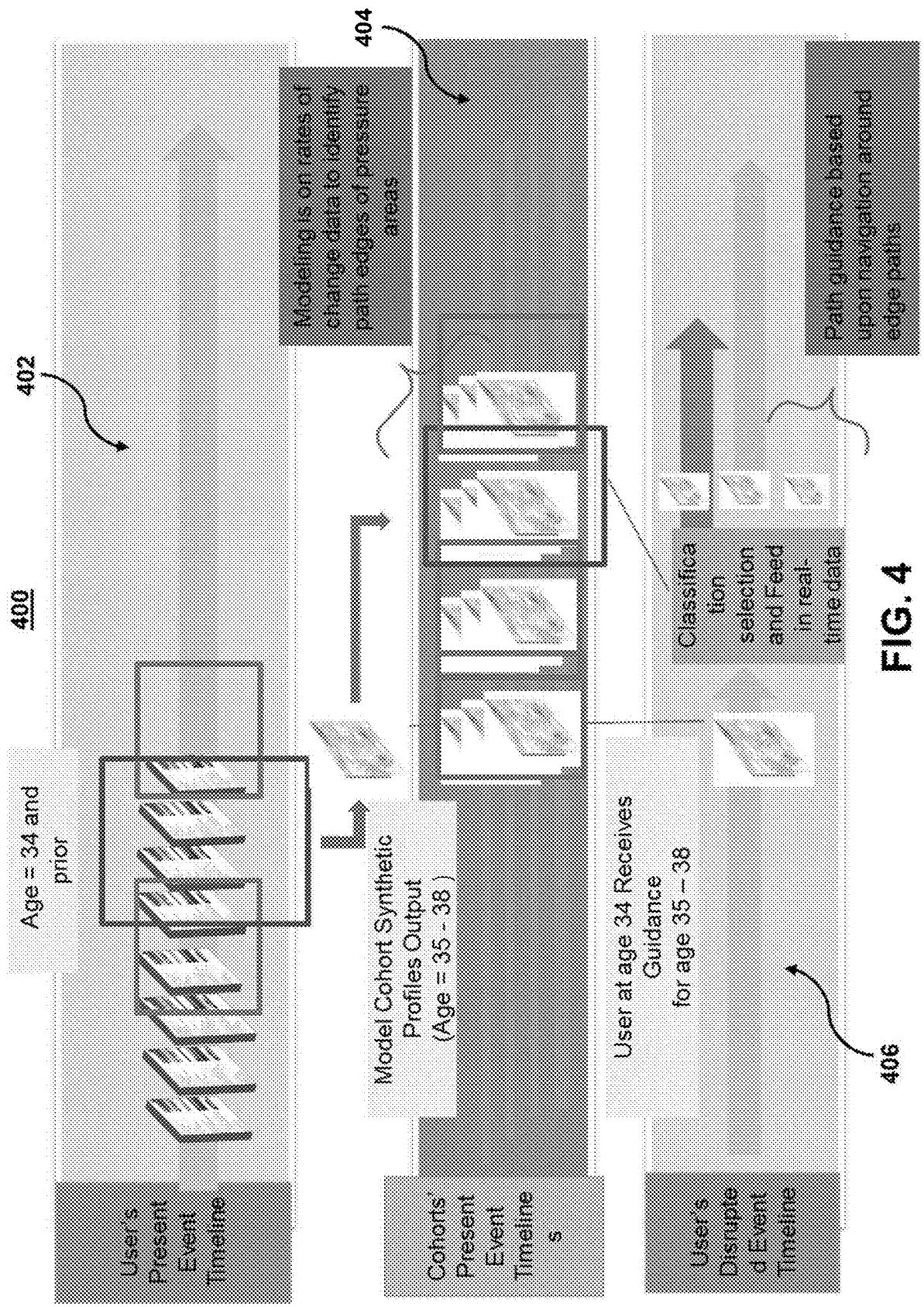
FIG. 4 shows a diagram for creating synthetic profiles, in accordance with one or more embodiments.

FIG. 4 shows a diagram for creating synthetic profiles, in accordance with one or more embodiments. For example, diagram 400 may represent a system workflow for responding to events based on predictions in time-series data. For example, the systems and methods may detect significant events (e.g., identify and measure discrete and non-discrete rates-of-change in time-series beyond a contextually relevant common threshold) that represents predicted significant events (e.g., predicted instances in first time-series data in which first rates-of-change over a first time period are beyond the contextually relevant threshold). Based on these predictions, the system may provide recommendations for changes in existing system states that may mitigate the effects and/or occurrence of these predicted events (e.g., provide recommended changes to current system state characteristics in order to mitigate predicted rates-of-change over a first time period in the first time-series data). Furthermore, these recommendations may be based on non-obvious positive and negative events that are time-based and contextually relevant to a given individual/entity.

For example, diagram 400 may represent three stages of predicting events using synthetic profiles. For example, stage 402 may represents processing a first data set. For example, the system may receive a first data set comprising a current state characteristic for a first system state. For example, the system may receive current account information for a first user account (e.g., a "first system state") of an automated family office system. The current account information may include current holdings, positions, investments, etc., which may represent a "current state characteristic" for the account. Additionally, the current account information may include investment strategies, rates of return, etc.

For example, the system may predict how a rate of change in time-series data (e.g., representing a current growth trajectory of the state) may be altered throughout the first time period. That is, the system may determine a current trajectory of the state based on current characteristics. For example, in the automated home office example, the system may determine a current trajectory of a portfolio of a user based on current characteristics (e.g., size of the portfolio, distributions within the portfolio, diversity in assets of the portfolio, etc.). However, as noted above, correctly predicting an occurrence of a significant event (which may comprise outliers to the normal trajectory), and in particular characteristics about these significant events (e.g., when an event may occur, what may be a source of the event, what rate of change the event may cause, etc.) presents a technical challenge. To overcome this technical challenge, the system does may generate predictions based on non-homogenous data. For example, while the system may use a first data set to determine a trajectory of a current state, the system may then use a different data set to predict the occurrence and/or effect of the outlier events. For example, the system may determine when an event occurs, the effects of which, may move a predicted trajectory outside the edge boundaries of the current trajectory. With respect to the automated home office example, this event may represent a windfall event that positively effects the portfolio (and/or its trajectory) or an emergency that negatively effects the portfolio (and/or its trajectory).

Stage 404 may represent detecting a cohort for the user for generating a synthetic profile upon which events may be predicted. The synthetic profile may be used to display events across time in the second data set (e.g., as shown in FIG. 2). For example, the system may select a second data set from a plurality of available datasets based on similarities between state characteristics for the second data set and the current state characteristic and the required future state characteristic, wherein the second data set comprises second rate-of-change data over a second time period. The second data set may comprise account data for another user. The similarities in the state characteristics may include current and future positions, values, expectations, etc. The system may use the similarities to determine a cohort for the first user. In some embodiments, the system may in some embodiments processes numerous data sets to identify predicted events and average information about them.

In some embodiments, the system selects a second data set (i.e., a non-homogenous data) that comprises actual (i.e., not predicted) data, creating a synthetic profile. For example, the system may use a first data set to determine a trajectory of a current state at stage 402. The system may then use a different data set to predict the occurrence of an outlier event and/or its effect in stage 404. For example, the system may select a second data set (i.e., a non-homogenous data) comprising actual (i.e., not predicted) data thus creating a "synthetic profile." The actual data found in the synthetic profile may comprise historic time-series data in which the historic time-series data indicates historic rates-of-change over a given time period. Furthermore, the system may filter the historic data set that is used based on similarities between the current state characteristics and/or required future state characteristics of the first system at the end of the first time period. That is, the system may select a second data set from a plurality of historic data sets based on the second data set having certain characteristics (e.g., similar state characteristics at the beginning or ending of a selected time period, similar trajectories, similar user profiles of users upon which the state is based, etc.). The system may then analyze the second data set for potentially significant events (e.g., events corresponding to a rate-of-change beyond a threshold).

As shown in stage 404, the system may normalize data by time-shifting cohort data. For example, the cohort data may comprise data that is multiple years in the beyond the data in the first data set. The system may then normalize this data by time-shifting any predicted event. For example, the system may generate a normalized rate-of-change event by normalizing the rate-of-change event based on the first data set. For example, the system may normalize the rate-of-change event by time-shifting the date of occurrence, adjusting a magnitude based on inflation, etc.

As such, the system alleviates issues, if any, resulting from the differences in the non-homogenous data, the information (e.g., time, magnitude, and/or other characteristics) about predicted events is normalized to correspond to the characteristics of the first data set. In some embodiments, the system may normalize the rate-of-change event by time-shifting a time of the rate-of-change event during the second time period to correspond to a time during the first time period. For example, the system may determine a first start time corresponding to the first time period. The system may determine a second start time corresponding to the second time period. The system may determine a difference between the second start time and a time of the rate-of-change event. The system may apply the difference to the first start time to determine a predicted time of the rate-of-change event during the first time period.

For example, as shown in FIG. 4, data in the second data set predicts events that may occur during the ages of 35-38 of a user that is current 34. For example, the second data set may comprise data from one or more other users that reflects events that occurred (and/or the effects thereof) during the ages of 35-38 for those users. The system normalizes the predicted event to occur in corresponding years for the user from the beginning of the first time period (even if the first time period and the second time period began at different times). For example, if an event is predicted in the second data set at occurring at age 36, the system may normalize this to the first user as likely to occur in two years.

The first feature input is then submitted to an artificial intelligence model that is trained to predict first rates-of-change over a first time period. The previously identified predictions (e.g., corresponding to a predicted event and/or characteristics of the event) are then applied to first rates-of-change over the first time period to generate recommendations for responding to the predicted events (e.g., recommending to maintain a current state, recommending to modify a state in a particular manner, etc.).

Stage 406 may represent a determine effects of events (predicted by the synthetic profile) on the first data and/or providing a recommendation for responding to the effects of the predicted event (e.g., by maintaining a current trajectory of the state or changing a trajectory of the state). For example, the system may input the first data set into a first model to generate first rate-of-change data over a first time period for the first system state. For example, the first model may predict the change in a user's account over a time period without any significant events.

In some embodiments, the system may use an artificial intelligence model to determine an effect of a rate-of-change event on a state of a system. For example, the system may use a model to determine whether a detected pressure point may have a positive or negative adjustment on a projected path of the time-series data for the first user. For example, the system may receive historical time-series data. The system may train the first model using unsupervised learning, wherein the first model comprises a convolutional neural network. The system may select the recommendation from a plurality of recommendations based on an output of the first model.

For example, the system may generate modified first rate-of-change data based on the normalized rate-of-change event. For example, the modified first rate-of-change data may predict the change in a user's account over a time period after applying disruptive events. For example, the system may generate for display, on a user interface, a recommendation based on the modified first rate-of-change data. For example, recommendation may include new holdings, positions, investments, etc. to mitigate the disruptive events. In some embodiments, the recommendation may comprise an isobaric graphical representation. Alternatively or additionally, the system the recommendation comprises an option to adjust the current state characteristic. For example, the system may recommend that a user adjust one or more current state characteristics to mitigate a detected event.

By training the artificial intelligence model or models on both the first and second data set, the system mitigates the problem with low amounts of high-quality data (e.g., the system maximizes the amount of training data available). Secondly, by using the actual data from the second data set (e.g., indicating past events), the system mitigates potential precision and accuracy issues in relying on an artificial intelligence model to predict outlier events to a trajectory of the time-series data and/or characteristics about the outlier events. By combining the normalized predicted events data with the first data set, the system generates predictions based on the state of the first data set, but with predicted events occurring at the normalized time and having the normalized magnitude.

Figure 5:
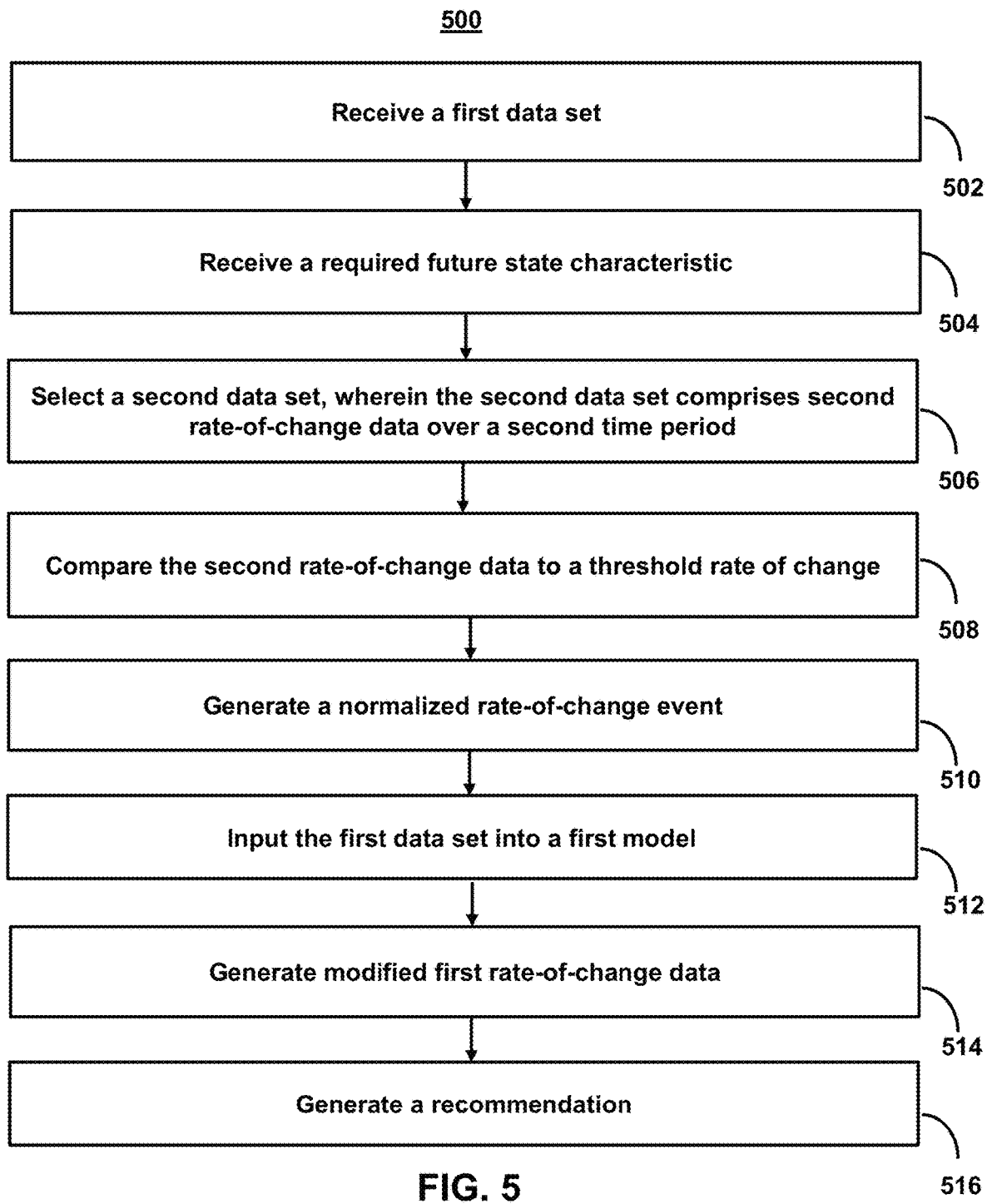
FIG. 5 shows a flowchart of the steps involved in responding to predicted events in computer systems, in accordance with one or more embodiments.

FIG. 5 shows a flowchart of the steps involved in responding to predicted events in computer systems based on predicted events in time-series data, in accordance with one or more embodiments. For example, the system may use process 500 (e.g., as implemented on one or more system components described above) in order to mitigate events in computer systems based on predicted events in time-series data using artificial intelligence models trained on non-homogeneous time-series data.

At step 502, process 500 (e.g., using one or more components described above) receives a first data set. For example, the system may receive a first data set comprising a current state characteristic for a first system state. For example, the system may receive current account information for a first user account (e.g., a "first system state") of an automated family office system. The current account information may include current holdings, positions, investments, etc., which may represent a "current state characteristic" for the account. Additionally, the current account information may include investment strategies, rates of return, etc.

In some embodiments, the system may apply one or more types of data conditioning to one or more data sets. For example, data visualization is an important step in analysis of a data set. Plotting large time-series data however generates large file sizes, which may slow down user interactions and strain computing resources. Accordingly, the system may condition data in a data set by applying a compression algorithm. For example, the system may receive a raw time-series data. The system may generate a data set by applying a compression algorithm to the raw time-series data.

In some embodiments, the system may compress data using midimax compression. Midimax compression involves determining the minimum, median, and maximum points of segments of the raw time-series data. Notably, midimax compression only returns a subset of the original raw time-series data, so no averaging, median interpolation, regression, and statistical aggregation. Accordingly, midimax compression avoids statistical manipulations on the underlying data when plotting. For example, the system may receive raw time-series data. The system may determine minimum, median, and maximum points in segments of the raw time-series data. The system may generate a data set based on the minimum, median, and maximum points.

Midimax compression may reduce data sizes such that large time-series plots may be processed quickly and consume fewer computing resources. Furthermore, while conventional compression algorithms may remove data, creating bias, midimax compression maintains general trends rather than small noise. Accordingly, midmiax compression may capture the variations in the raw data set using a smaller number of points and to process larger data sets more quickly.

To perform a midimax compression, the system may receive an input of the raw time-series data and a compression factor (e.g., a float number). For example, the system may receive raw time-series data and receive a compression factor. The system may segment the raw time-series data into data segments. For example, the system may split the raw time-series data into non-overlapping segments of equal size where the size is calculated as: segment_size=floor (3*compression factor). By using the compression factor of three, the system determines minimum, median, and maximum values taken from each segment. The system may sort values in each of the data segments. For example, the system may sort the values in each segment in ascending order. The system may select respective minimum and maximum values from the values in each of the data segments. For example, by selecting the first and last values for the min and max values, the system maximizes the variance and retains the most information in the compression. The system may determine a respective median value for each of the data segments based on the respective minimum and maximum values. For example, the system may determine the median by selecting a middle value for the median, where the middle position is defined as med_index=floor(segment_size/2). The system may re-sort the respective median value for each of the data segments. For example, the system may re-sort the selected points by the original index, which may be timestamped.

In some embodiments, the system may apply one or more types of data conditioning to one or more data sets. For example, data visualization is an important step in analysis of a data set. Plotting large time-series data however generates large file sizes, which may slow down user interactions and strain computing resources. Accordingly, the system may condition data in a data set using fractal synthesis optimizations. Fractal synthesis may include application of a regularization. For example, the system may receive raw time-series data. The system may generate a data set by applying a fractal synthesis algorithm to the raw time-series data.

For example, regularization is used to reduce an error in a data model by fitting a function appropriately on the given training set and avoid overfitting. The system may receive raw time-series data. The system may apply a regularization to the raw time-series data to determine a function for the raw time-series data. The system may generate a data set based on the function.

At step 504, process 500 (e.g., using one or more components described above) receives a required future state characteristic. For example, the system may receive a required future state characteristic for the first system state. For example, the "required future state characteristic" may comprise a given rate of return, a total value of the account, etc. for the user account.

At step 506, process 500 (e.g., using one or more components described above) selects a second data set, wherein the second data set comprises second rate-of-change data over a second time period. For example, the system may select a second data set from a plurality of available datasets based on similarities between state characteristics for the second data set and the current state characteristic and the required future state characteristic, wherein the second data set comprises second rate-of-change data over a second time period. The second data set may comprise account data for another user. The similarities in the state characteristics may include current and future positions, values, expectations, etc. The system may use the similarities to determine a cohort for the first user.

In some embodiments, the system selects a second data set (i.e., a non-homogenous data) comprising actual (i.e., not predicted) data, creating a synthetic profile. For example, the actual data found in the synthetic profile comprises second time-series data in which the second time-series data indicates second rates-of-change over a second time period. The system may select the second data set (or a plurality of data sets) based on similarities between the current state characteristics and/or required future state characteristics of the first system at the end of the first time period. The system may then analyze the second data set for predicted events (e.g., a rate-of-change beyond a threshold).

In some embodiments, the system may use an artificial intelligence model to select a cohort of the user. For example, the system may use a model to select a cohort of the user and then select a data set corresponding to the selected cohort. For example, the system may receive historical time-series data. The system may train a second model using unsupervised learning, wherein the second model comprises a convolutional neural network. The system may select the second data set from the plurality of available datasets using the second model.

At step 508, process 500 (e.g., using one or more components described above) compares the second rate-of-change data to a threshold rate of change. For example, the system may compare the second rate-of-change data to a threshold rate of change to detect a rate-of-change event. For example, the system may detect events in the system state based on large changes in the rate-or-change of the user account. These large charges may correspond to external events such as a marriage, death, divorce, market downturn, etc.

In some embodiments, the system may determine an edge condition. Edge conditions are data points where the system has determined that a strong correlation exists between two or more other data points. For example, the system may determine an event type for the rate-of-change event. The system may determine the threshold rate based on the event type.

The system may determine based on data about the user that the user is likely to experience an event of a given type. For example, the system may retrieve user profile data. The system may determine the event type based on the user profile data.

At step 510, process 500 (e.g., using one or more components described above) generates a normalized rate-of-change event. For example, the system may generate a normalized rate-of-change event by normalizing the rate-of-change event based on the first data set. For example, the system may normalize the rate-of-change event by time-shifting the date of occurrence, adjusting a magnitude based on inflation, etc.

In some embodiments, the system may normalize the rate-of-change event by time-shifting a time of the rate-of-change event during the second time period to correspond to a time during the first time period. For example, the system may determine a first start time corresponding to the first time period. The system may determine a second start time corresponding to the second time period. The system may determine a difference between the second start time and a time of the rate-of-change event. The system may apply the difference to the first start time to determine a predicted time of the rate-of-change event during the first time period.

At step 512, process 500 (e.g., using one or more components described above) inputs the first data set into a first model. For example, the system may input the first data set into a first model to generate first rate-of-change data over a first time period for the first system state. For example, the first model may predict the change in a user's account over a time period without any disruptive events.

In some embodiments, the system may use an artificial intelligence model to determine an effect of a rate-of-change event on a state of a system. For example, the system may use a model to determine whether a detected pressure point may have a positive or negative adjustment on a projected path of the time-series data for the first user. For example, the system may receive historical time-series data. The system may train the first model using unsupervised learning, wherein the first model comprises a convolutional neural network. The system may select the recommendation from a plurality of recommendations based on an output of the first model.

At step 514, process 500 (e.g., using one or more components described above) generates modified first rate-of-change data. For example, the system may generate modified first rate-of-change data based on the normalized rate-of-change event. For example, the modified first rate-of-change data may predict the change in a user's account over a time period after applying disruptive events.

At step 516, process 500 (e.g., using one or more components described above) generates a recommendation. For example, the system may generate for display, on a user interface, a recommendation based on the modified first rate-of-change data. For example, recommendation may include new holdings, positions, investments, etc. to mitigate the disruptive events. In some embodiments, the recommendation may comprise an isobaric graphical representation. Alternatively or additionally, the system the recommendation comprises an option to adjust the current state characteristic. For example, the system may recommend that a user adjust one or more current state characteristics to mitigate a detected event.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

Figure 6:
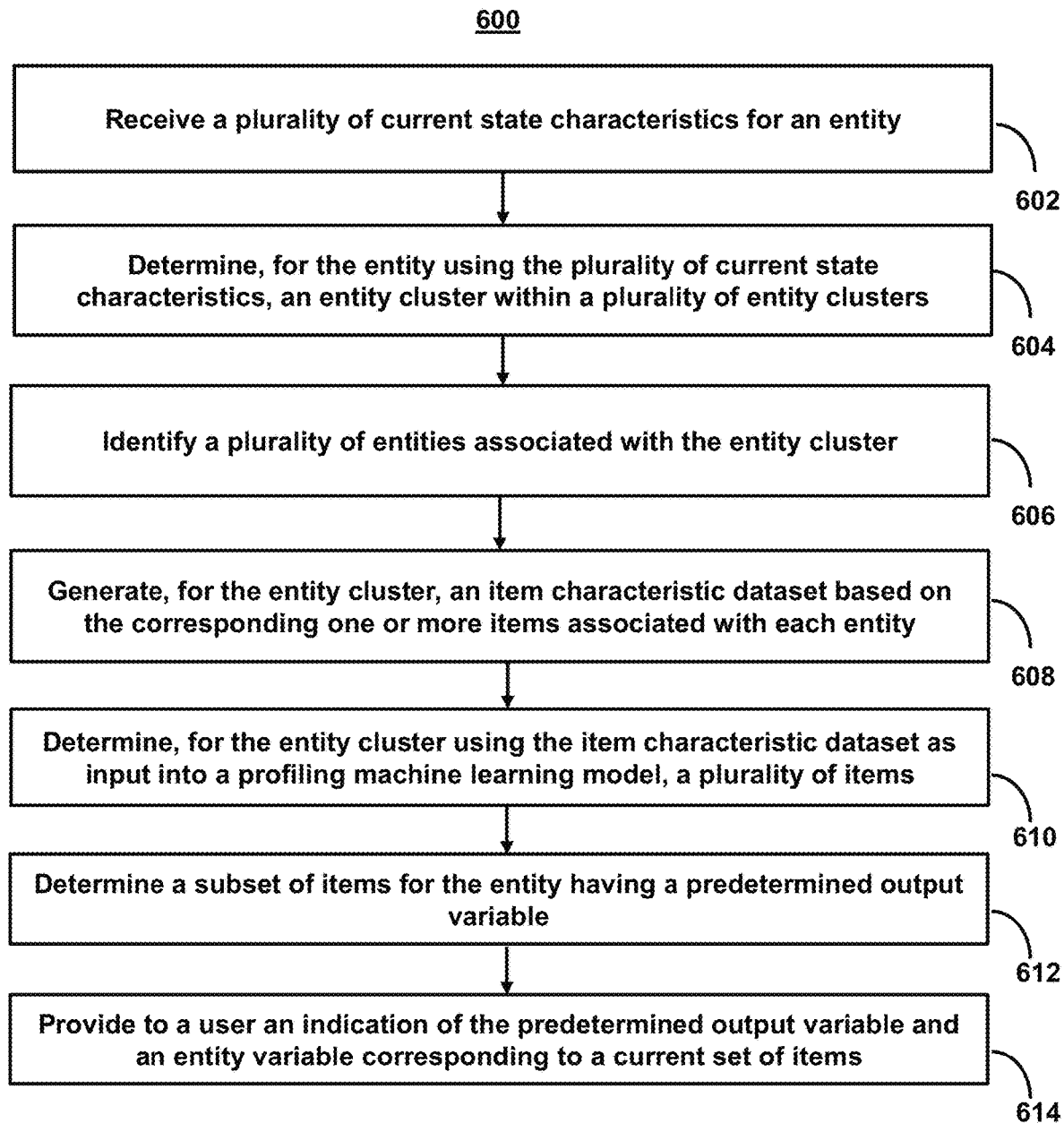
FIG. 6 shows a flowchart of the steps involved in identifying items associated with synthetic entities, in accordance with one or more embodiments.

FIG. 6 illustrates shows a flowchart 600 of the steps involved in identifying items associated with synthetic entities (e.g., synthetic user profiles generated based on peers of a user). One use of embodiment may involve recommending financial products to a user based on financial products that successful peers of the user are using. For example, a user may have a particular set of demographics (e.g., a particular age range, a particular salary range, a particular family size, a particular net worth, particular accounts, etc.). In addition, the user may use certain financial products that may not be optimal for the user's demographic and preferences. For example, the user's financial products may bring a subpar return on the user's investments. Accordingly, the system may identify and recommend (e.g., using machine learning) financial products to the user that successful peers of the user are using. In particular, the system may use machine learning to determine a demographic cluster for the user as well as product characteristics for that cluster. Based on the product characteristics, the system may identify products to recommend to the user. The system my select products with the best/better returns than current returns for the user.

In some embodiments, the system may receive or access entity data (e.g., user data). Thus, at step 602, the system receives a plurality of current state characteristics for an entity. In some embodiments, the system may receive an entity dataset that includes a plurality of current state characteristics for an entity, such that the plurality of current state characteristics comprises entity characteristics. For example, the system may receive demographic data for a user such that the user is represented by the entity. The entity may include a plurality of fields storing a plurality of values corresponding to the demographic and other suitable information of the user. For example, the fields may include an age range, income, marital status, risk type, number of dependents, net worth, past investment returns, and/or other suitable data. In some embodiments, the system may receive product identifiers for the products that the user is using or has invested in.

The system may then use a clustering machine learning model to classify a user into a cluster of like users (e.g., determine a peer group for the user). Thus, at step 604, the system determines, for the entity using the plurality of current state characteristics, an entity cluster within a plurality of entity clusters. In some embodiments, the system may use the plurality of current state characteristics as input into a clustering machine learning model to determine, for the entity, an entity cluster within a plurality of entity clusters. The clustering machine learning model may be a machine learning model that has been trained to classify the entity based on an entity's current state characteristics, into the entity cluster of the plurality of entity clusters. Furthermore, each entity cluster within the plurality of entity clusters may be defined by a corresponding set of current state characteristics for that cluster. Thus, the system may input the current state characteristics associated with the entity into the clustering machine learning model and may receive, from the clustering machine learning model and identifier associated with a cluster into which the user was classified. In some embodiments, the system may receive multiple cluster identifiers (e.g., entity identifiers).

In some embodiments, the clustering machine learning model may be a machine learning model as illustrated in FIG. 3A and/or FIG. 3B and described in combination with those figures. The clustering machine learning model may be trained using training data (e.g., a training dataset) that includes a plurality of users. For example, the system may receive a training dataset that includes a set of current state characteristics for a plurality of training entities. The set of current state characteristics may include the entity characteristics and item representations associated with each corresponding entity. For example, the system may have access to user data which may be stored as entity data such that each entity represents a user. The system may identify users that are successful, for example, based on total net worth, investment returns over the last five years, the last three years, the last year, etc. The system may then create a dataset (e.g., a training dataset) storing the user information for those successful users. That dataset may store entity characteristics such as user demographic data together with corresponding items associated with those entities such as identifiers of financial products that the user is using or in which the user has invested. In some embodiments, the system may not separate entities corresponding to successful users from the dataset prior to training the clustering machine learning model.

The system may then use the dataset to train the clustering machine learning model. In particular, the system may train using the training dataset, the clustering machine learning model. As discussed above, the clustering machine learning model may be trained to classify a given entity based on a given entity's current state characteristics into a corresponding entity cluster of a plurality of entity clusters. Furthermore, each entity cluster within the plurality of entity clusters may be defined by the corresponding set of current state characteristics. The clustering machine learning model may be trained as described above as related to FIG. 3A and FIG. 3B. In some embodiments, the clustering machine learning model may generate a plurality of entity clusters based on the training data (e.g., the received dataset).

As discussed above, the system may receive a training dataset that includes a set of current state characteristics for a plurality of entities (e.g., a plurality of users). The set of current state characteristics may include the entity characteristics (e.g., user demographic data) and item representations associated with each corresponding entity (e.g., financial products that the user is using and/or in which the user invested). In some embodiments, the system may receive the training dataset after the training dataset was modified to remove "unsuccessful users". For example, the system may use one or more criterions to determine which users are successful (e.g., based on net worth, income, etc.).

When the data is received it may be input into the training routine of a machine learning model to generate a trained clustering machine learning model. Thus, the system may train, using the training dataset, the clustering machine learning model such that the clustering machine learning model is trained to classify a given entity based on a given entity's current state characteristics into a corresponding entity cluster of a plurality of entity clusters. When the clustering machine learning model is trained, the clustering machine learning model may define each entity cluster within the plurality of entity clusters by the corresponding set of current state characteristics. As discussed above, the current state characteristics for each entity (e.g., each user) may include demographic data, income data, profit data, and/or other suitable data.

Turning back to FIG. 6, at step 606, the system identifies a plurality of entities associated with the entity cluster. For example, the system may identify, for a user corresponding to the entity, a plurality of peers of that user such that those peers use particular products (e.g., financial products). The peers of the user may be other users that share a certain level of demographic information with the user. Thus, the system may identify a plurality of entities associated with the entity cluster. Each entity within the plurality of entities may be associated with corresponding one or more items. In some embodiments, the identification process may be a comparison between entity data (e.g., demographic data of the user) and other entity data (e.g., demographic data of other users). Thus, the system may identify peers of the user based on the demographic data. In some embodiments, the system may use a machine learning model in the identification process. In particular, the system may identify the plurality of entities associated with the entity cluster by inputting the entity dataset and a plurality of candidate peer entity datasets into a peer identification machine learning model to identify entity peers for the entity. That is, the system may input entity data for a plurality of entities (e.g., demographic data for a plurality of users) and entity data for the entity (e.g., demographic data for the user in question) into the peer identification machine learning model and may be received from the peer identification machine learning model identifiers of the peer entities.

In some embodiments, the peer identification machine learning model may be trained using the following operations. The system may add a plurality of peer group identifiers to a training dataset to generate a peer dataset. The training dataset may be organized such that each entry within the training dataset corresponds to an entry and includes a corresponding peer group. For example, each entry within the training dataset may include demographic data for a particular user. The system may also add a peer group as a target feature to each entry. Thus, the system may then perform supervised learning on the peer identification machine learning model using the training dataset. In some embodiments, the system may input the peer dataset into a training routine of the peer identification machine learning model. Using the training routine, the system may train the peer identification machine learning model to identify entity peers for a given entity based on given current state characteristics of the given entity and corresponding current state characteristics for a candidate peer entity. In some embodiments, the training routine may train the machine learning model as discussed in relation to FIG. 3A and FIG. 3B.

Turning back to FIG. 6, at step 608, the system generates, for the entity cluster, an item characteristic dataset based on the corresponding one or more items associated with each entity. For example, the system may have identified a plurality of entities associated with the entity cluster. The entities within the plurality of entities may correspond to successful peers of the user. As discussed above, successful users may be those with higher returns on their investments, higher income, and/or other suitable users. The system may use one or more criterions to determine successful users that are peers of the user. The system may then determine which products those users use. Thus, the system may identify item characteristics for those items and store those item characteristics in the item characteristic dataset. Item characteristics may include return on investment data, risk data, reward data, and/or other data associated with the items.

In some embodiments, the system may perform the following operations for determining item characteristics. The system may locate, within a database, one or more entries associated with the corresponding one or more items. For example, the system may use an item identifier (e.g., a product identifier) to query a database that stores item data (e.g., product characteristics). In response to the query the system may receive that item data. The system may then generate a plurality of fields for the plurality of current state characteristics. The plurality of fields may include a plurality of values for a plurality of item characteristics. For example, the system may generate a data structure that stores the fields and the corresponding values.

Turning back to FIG. 6, at step 610, the system determines, for the entity cluster using the item characteristic dataset as input into a profiling machine learning model, a plurality of items to be inked with the entity cluster. For example, the system may determine a plurality of products to recommend to the user using a machine learning model to predict which products the user may prefer and that may be better suited for the user than the current products that the user is using. In some embodiments, the system may determine, for the entity cluster using the item characteristic dataset as input into a profiling machine learning model, a plurality of items. The profiling machine learning model may have been trained to identify, for a given item characteristic set, a given plurality of items to be linked with a given entity cluster. For example, the system may input into the profiling machine learning model the item characteristic dataset. The profiling machine learning model may output one or more products to recommend for the user. In some embodiments, the profiling machine learning model may be a machine learning model as described in relation to FIG. 3A and/or FIG. 3B.

In some embodiments, the profiling machine learning model may be trained using supervised learning. For example, the system may add, to the training dataset, item characteristics associated with corresponding items to generate an updated training dataset. For example, the training dataset may include item identifiers for items various users use. The system may retrieve and add item characteristics (e.g., item characteristics as described above) to that training dataset.

The system may then train, using the updated training dataset, the profiling machine learning model to identify, for the given item characteristic set, the given plurality of items to be linked with the given entity cluster. In some embodiments, the system may train the machine learning model as described in relation to FIG. 3A and FIG. 3B. Furthermore, in some embodiments the system may user unsupervised training to train the profiling machine learning model. Once the profiling machine learning model, the clustering machine learning model and the peer identification machine learning model have been trained that may be provided for use. For example, the system may enable access to these machine learning models for use in product recommendations.

Turning back to FIG. 6, at step 612, the system determines a subset of items for the entity having a predetermined output variable. For example, the system may identify one or more financial products for the user based on the return on investment associated with the products such that the user is recommended the products with the highest return on investment. The products may be selected based on a threshold return on investment or based on other criteria. Thus, the system may determine, based on the plurality of items, a subset of items for the entity having a predetermined output variable. The predetermined output variable may indicate a total return on investment (e.g., a percentage value) for the selected products. In some embodiments, the system may rank the products based on their corresponding output variables (e.g., return on investment values) and may recommend one or more products with the highest values.

Figure 7:
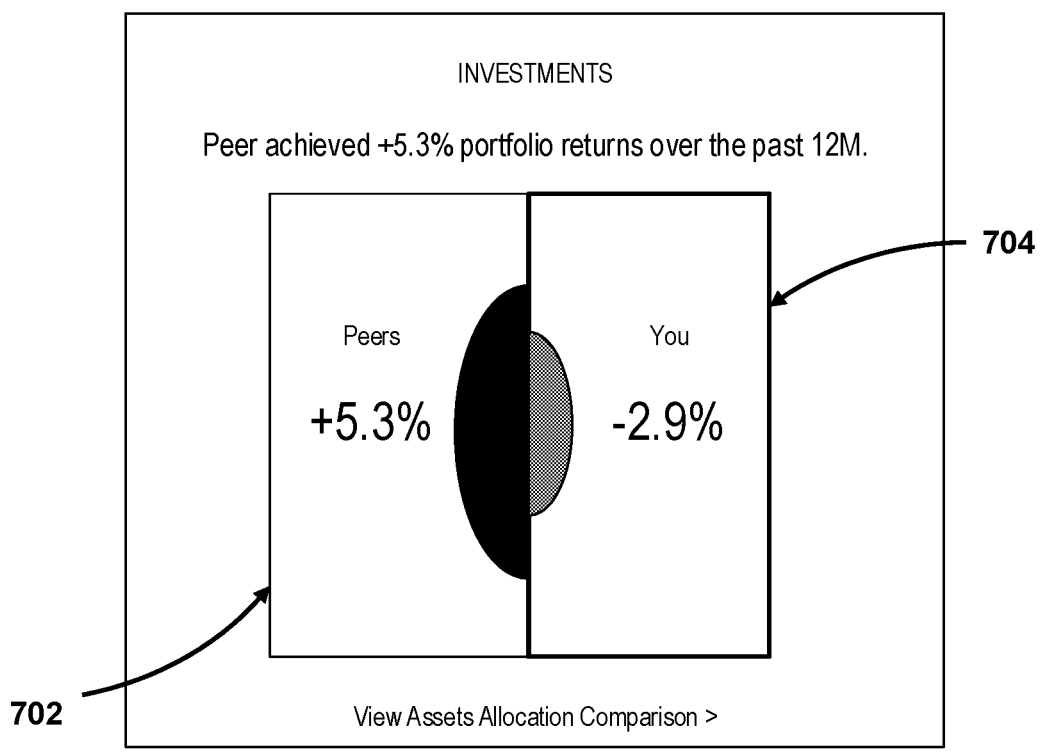
FIG. 7 illustrates a display for showing a user investment differences, in accordance with one or more embodiments.

At step 614, the system provides to a user an indication of the predetermined output variable and an entity variable corresponding to a current set of items. For example, the system may generate for display to a user a return on investment for current products that the user is using as contrasted with a return on investment for recommended products. FIG. 7 illustrates a display for showing a user investment differences. Display portion 702 illustrates a return on investment for the user's peers (e.g., items that were recommended as a result of the process above). And portion 704 shows the user's current investment returns.

As discussed above, the system may provide to a user an indication of the predetermined output variable and an entity variable corresponding to a current set of items. The predetermined output variable may be determined based on item data within the subset of items and the entity variable may be determined based on current item data within the current set of items. In some embodiments, the system may generate a synthetic profile when providing the indication of the predetermined output variable. In particular, the system may generate a synthetic profile for the entity. The synthetic profile may include current state characteristics associated with the entity cluster of the plurality of entity clusters. For example, the system may retrieve demographic data associated with the entity cluster into which the entity was classified. The system may then generate a synthetic entity (e.g., a synthetic user) based on the demographic data. The system may then add, to the synthetic profile the subset of items and a combination of variables associated with the subset of items. For example, the system may add product identifiers of the products that are recommended to the user. In addition, the system may calculate a return on investment for those products and add a combination of that return on investment to the synthetic profile. The system may then generate, for display on a client device, indications of the synthetic profile, the combination of variables, the current state characteristics of the entity, or a new entity variable associated with the current state characteristics of the entity. For example, the system may generate for display some demographic data associated with the synthetic profile, the combined return on investment for the current products that user is using, the combined return on investment for recommended products, and/or other suitable data.

In some embodiments, the system may enable the user to manipulate the placement of the entity corresponding to the user into a particular entity cluster. In particular, the system may compare entity characteristics of the entity with cluster characteristics of the entity cluster. For example, the system may compare user demographics of a user represented by the entity and demographics associated with the entity cluster (e.g., associated with the synthetic profile). The system may identify, based on the comparison, one or more differences between the entity characteristics and the entity cluster characteristics. For example, the age range may not be the same and/or income level may be slightly different.

The system may then generate for display to the user one or more interactive indications of the one or more differences. The user may be enabled to change one or more cluster characteristics corresponding to the one or more differences. For example, the system may enable the user to change cluster placement. For example, the user may be enabled to modify the different indicators and based on the modifications the system may assign the user to a different entity cluster.

In some embodiments, the system may enable the user to select a cluster and/or override a selection of the cluster. The system may compare entity characteristics of the entity with cluster characteristics of the entity cluster and identify one or more differences between the entity characteristics and the cluster characteristics. As discussed above, the system may determine the differences between user demographics and the demographics within the synthetic profile. Based on that information, the system may generate for display entity cluster definitions (e.g., synthetic profiles associated with each entity cluster) and enable the user to select one.

Based on user interaction with the one or more interactive indications, the system may determine, using the clustering machine learning model one or more different clusters associated with the user. When the user manipulates certain information, the system may re-input the data into the clustering machine learning model to determine whether a user should be assigned to a different entity cluster. Thus, the system may generate for display one or more of different sets of characteristics corresponding to the one or more different clusters and enable the user to select a new entity cluster.

In some embodiments, the system may enable project of predictions for a future time. For example, the system may predict return on investment for the recommended products into the future (e.g., 1 year, 5 years, etc.). The system may receive first time-series data for one or more items associated with the current state characteristics of the entity and second time-series data for the subset of items associated with the entity cluster of the plurality of entity clusters. When the data is received the system may determine, a first set of future state variables for the one or more items associated with the current state characteristics. In addition, the system may determine, a second set of future state variables for the subset of items associated with the entity cluster of the plurality of entity clusters. These determinations may be performed using a machine learning model as described above. The system may then generate for display one or more indications of the first set of future state variables and the second set of future state variables. For example, the system may generate future returns for the recommended financial products.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for responding to predicted events in computer systems based on outlier events in time-series data using artificial intelligence models trained on non-homogeneous time-series data.

2. The method of any one of the preceding embodiments, further comprising: receiving a first data set comprising a current state characteristic for a first system state; receiving a required future state characteristic for the first system state; selecting a second data set from a plurality of available datasets based on similarities between state characteristics for the second data set and the current state characteristic and the required future state characteristic, wherein the second data set comprises second rate-of-change data over a second time period; comparing the second rate-of-change data to a threshold rate of change to detect a rate-of-change event; generating a normalized rate-of-change event by normalizing the rate-of-change event based on the first data set; inputting the first data set into a first model to generate first rate-of-change data over a first time period for the first system state; generating modified first rate-of-change data based on the normalized rate-of-change event; and generating for display, on a user interface, a recommendation based on the modified first rate-of-change data.

3. The method of any one of the preceding embodiments, further comprising: receiving a raw time-series data; and generating the second data by applying a compression algorithm to the raw time-series data.

4. The method of any one of the preceding embodiments, further comprising: receiving a raw time-series data; determining minimum, median, and maximum points in segments of the raw time-series data; and generating the second data based on the minimum, median, and maximum points.

5. The method of any one of the preceding embodiments, further comprising: receiving a raw time-series data; receiving a compression factor; segmenting the raw time-series data into data segments; sorting values in each of the data segments; selecting respective minimum and maximum values from the values in each of the data segments; determining a respective median value for each of the data segments based on the respective minimum and maximum values; and re-sorting the respective median value for each of the data segments.

6. The method of any one of the preceding embodiments, further comprising: receiving a raw time-series data; and generating the second data by applying a fractal synthesis algorithm to the raw time-series data.

7. The method of any one of the preceding embodiments, further comprising: receiving a raw time-series data; applying a regularization to the raw time-series data to determine a function for the raw time-series data; and generating the second data based on the function.

8. The method of any one of the preceding embodiments, further comprising: receiving historical time-series data; training a second model using unsupervised learning, wherein the second model comprises a convolutional neural network; and selecting the second data set from the plurality of available datasets using the second model.

9. The method of any one of the preceding embodiments, further comprising: receiving historical time-series data; training the first model using unsupervised learning, wherein the first model comprises a convolutional neural network; and selecting the recommendation from a plurality of recommendations based on an output of the first model.

10 The method of any one of the preceding embodiments, wherein generating the normalized rate-of-change event by normalizing the rate-of-change event based on the first data set further comprises: determining a first start time corresponding to the first time period; determining a second start time corresponding to the second time period; determining a difference between the second start time and a time of the rate-of-change event; and applying the difference to the first start time to determine a predicted time of the rate-of-change event during the first time period.

11. The method of any one of the preceding embodiments, wherein the recommendation comprises an isobaric graphical representation.

12. The method of any one of the preceding embodiments, further comprising: determining an event type for the rate-of-change event; and determining the threshold rate based on the event type.

13. The method of any one of the preceding embodiments, further comprising: retrieving user profile data; and determining the event type based on the user profile data.

14. The method of any one of the preceding embodiments, wherein the recommendation comprises an option to adjust the current state characteristic.

15. A tangible, non-transitory, machine-readable medium storing instructions that, when executed by a data processing apparatus, cause the data processing apparatus to perform operations comprising those of any of embodiments 1-14.

16. A system comprising one or more processors; and memory storing instructions that, when executed by the processors, cause the processors to effectuate operations comprising those of any of embodiments 1-14.

17. A system comprising means for performing any of embodiments 1-14.

The below other present techniques will be better understood with reference to the following enumerated embodiments:

1. A method for identifying items, the method comprising: receiving an entity dataset comprising a plurality of current state characteristics for an entity, wherein the plurality of current state characteristics comprises entity characteristics; determining, for the entity using the plurality of current state characteristics as input into a clustering machine learning model, an entity cluster within a plurality of entity clusters, wherein the clustering machine learning model has been trained to classify the entity based on an entity's current state characteristics, into the entity cluster of the plurality of entity clusters, and wherein each entity cluster within the plurality of entity clusters is defined by a corresponding set of current state characteristics; identifying a plurality of entities associated with the entity cluster, wherein each entity within the plurality of entities is associated with corresponding one or more items; generating, for the entity cluster, an item characteristic dataset based on the corresponding one or more items associated with each entity; determining, for the entity cluster using the item characteristic dataset as input into a profiling machine learning model, a plurality of items, wherein the profiling machine learning model has been trained to identify, for a given item characteristic set, a given plurality of items to be linked with a given entity cluster; determining, based on the plurality of items, a subset of items for the entity having a predetermined output variable; and providing to a user an indication of the predetermined output variable and an entity variable corresponding to a current set of items, wherein the predetermined output variable is determined based on item data within the subset of items and the entity variable is determined based on current item data within the current set of items.

2. The method of any one of the preceding embodiments, further comprising: locating, within a database, one or more entries associated with the corresponding one or more items; and generating a plurality of fields for the plurality of current state characteristics, wherein the plurality of fields comprises a plurality of values for a plurality of item characteristics.

3. The method of any one of the preceding embodiments, wherein providing to the user the indication comprises: generating a synthetic profile for the entity, wherein the synthetic profile comprises current state characteristics associated with the entity cluster of the plurality of entity clusters; adding, to the synthetic profile the subset of items and a combination of variables associated with the subset of items; and generating, for display on a client device, indications of the synthetic profile, the combination of variables, the current state characteristics of the entity, or a new entity variable associated with the current state characteristics of the entity.

4. The method of any one of the preceding embodiments, further comprising: receiving first time-series data for one or more items associated with the current state characteristics of the entity and second time-series data for the subset of items associated with the entity cluster of the plurality of entity clusters; determining, a first set of future state variables for the one or more items associated with the current state characteristics; determining, a second set of future state variables for the subset of items associated with the entity cluster of the plurality of entity clusters; and generating for display one or more indications of the first set of future state variables and the second set of future state variables.

5. The method of any one of the preceding embodiments, further comprising receiving a training dataset comprising a set of current state characteristics for a plurality of training entities, wherein the set of current state characteristics comprises the entity characteristics and item representations associated with each corresponding entity.

6. The method of any one of the preceding embodiments, further comprising training, using the training dataset, the clustering machine learning model, wherein the clustering machine learning model is trained to classify a given entity based on a given entity's current state characteristics into a corresponding entity cluster of a plurality of entity clusters, and wherein each entity cluster within the plurality of entity clusters is defined by the corresponding set of current state characteristics.

7. The method of any one of the preceding embodiments, further comprising: adding, to the training dataset, item characteristics associated with corresponding items to generate an updated training dataset; and training, using the updated training dataset, the profiling machine learning model to identify, for the given item characteristic set, the given plurality of items to be linked with the given entity cluster.

8. The method of any one of the preceding embodiments, further comprising identifying, within the entity dataset, the plurality of entities associated with the entity cluster comprises inputting the entity dataset and a plurality of candidate peer entity datasets into a peer identification machine learning model to identify entity peers for the entity.

9. The method of any one of the preceding embodiments, further comprising training the peer identification machine learning model by: adding a plurality of peer group identifiers to a training dataset to generate a peer dataset, wherein each entry within the training dataset corresponds to an entry and includes a corresponding peer group; and inputting the peer dataset into a training routine of the peer identification machine learning model, wherein the peer identification machine learning model is trained to identify entity peers for a given entity based on given current state characteristics of the given entity and corresponding current state characteristics for a candidate peer entity.

10. The method of any one of the preceding embodiments, further comprising: comparing entity characteristics of the entity with cluster characteristics of the entity cluster; identifying one or more differences between the entity characteristics and the cluster characteristics; and generating for display to the user one or more interactive indications of the one or more differences, wherein the user is enabled to change one or more cluster characteristics corresponding to the one or more differences.

10. The method of any one of the preceding embodiments, further comprising: based on user interaction with the one or more interactive indications, determining, using the clustering machine learning model one or more different clusters associated with the user; generating for display one or more of different sets of characteristics corresponding to the one or more different clusters; and enabling the user to select a new entity cluster.

11. A tangible, non-transitory, machine-readable medium storing instructions that, when executed by a data processing apparatus, cause the data processing apparatus to perform operations comprising those of any of embodiments 1-10.

12. A system comprising one or more processors; and memory storing instructions that, when executed by the processors, cause the processors to effectuate operations comprising those of any of embodiments 1-10.

13. A system comprising means for performing any of embodiments 1-10.

What is claimed is:

1. A system for training machine learning models, the system comprising:
   one or more processors; and
   a non-transitory machine readable medium comprising instructions that when executed by the one or more processors cause operations comprising:
      receiving a training dataset comprising a plurality of current state characteristics for a plurality of entities, wherein the plurality of current state characteristics comprise entity characteristics and corresponding items associated with entities;
      training, using unsupervised learning and the training dataset, a clustering machine learning model comprising a convolutional neural network, wherein the convolutional neural network is trained to classify an entity, based on an entity's current state characteristics, into one of a plurality of entity clusters, and wherein each entity cluster within the plurality of entity clusters is defined by a corresponding set of current state characteristics for that cluster;
      updating the training dataset with item characteristics associated with the corresponding items to generate an updated training dataset;
      training, using the updated training dataset, a profiling machine learning model, wherein the profiling machine learning model identifies, for given set of item characteristics, one or more items to be linked with a given entity cluster when corresponding item characteristics are input into the profiling machine learning model;
      training a peer identification machine learning model, wherein the training comprises:
         adding a plurality of peer group identifiers to the training dataset to generate a peer dataset, wherein each entry within the training dataset is associated with a corresponding entity and includes a corresponding peer group; and
         inputting the peer dataset into a training routine of the peer identification machine learning model, wherein the peer identification machine learning model is trained to identify entity peers for a given entity based on given current state characteristics of the given entity and corresponding current state characteristics for a candidate peer entity; and
      providing user access to the clustering machine learning model, the profiling machine learning model, and the peer identification machine learning model.

2. A method for identifying items, the method comprising:
   receiving an entity dataset comprising a plurality of current state characteristics for an entity, wherein the plurality of current state characteristics comprises entity characteristics;
   determining, for the entity using the plurality of current state characteristics as input into a clustering machine learning model comprising a convolutional neural network, an entity cluster within a plurality of entity clusters, wherein the convolutional neural network has been trained to classify the entity, based on an entity's current state characteristics, into the entity cluster of the plurality of entity clusters, and wherein each entity cluster within the plurality of entity clusters is defined by a corresponding set of current state characteristics, and wherein the convolutional neural network has been trained using unsupervised learning and a training dataset, to classify a given entity, based on the given entity's current state characteristics, into a corresponding entity cluster of a plurality of entity clusters, and wherein each entity cluster within the plurality of entity clusters is defined by the corresponding set of current state characteristics for that cluster;
   identifying, using a peer identification machine learning model, a plurality of entities associated with the entity cluster, wherein each entity within the plurality of entities is associated with corresponding one or more items, and wherein the peer identification machine learning model is trained identify entity peers for the given entity based on adding a plurality of peer group identifiers to the training dataset to generate a peer dataset and by inputting the peer dataset into a training routine of the peer identification machine learning model;
   generating, for the entity cluster, an item characteristic dataset based on the corresponding one or more items associated with each entity;
   determining, for the entity cluster using the item characteristic dataset as input into a profiling machine learning model, a plurality of items, wherein the profiling machine learning model has been trained to identify, for a given item characteristic set, a given plurality of items to be linked with a given entity cluster;
   determining, based on the plurality of items, a subset of items for the entity having a predetermined output variable; and
   providing to a user an indication of the predetermined output variable and an entity variable corresponding to a current set of items, wherein the predetermined output variable is determined based on item data within the subset of items and the entity variable is determined based on current item data within the current set of items.

3. The method of claim 2, further comprising:
   locating, within a database, one or more entries associated with the corresponding one or more items; and generating a plurality of fields for the plurality of current state characteristics, wherein the plurality of fields comprises a plurality of values for a plurality of item characteristics.

4. The method of claim 2, wherein providing to the user the indication comprises:
generating a synthetic profile for the entity, wherein the synthetic profile comprises current state characteristics associated with the entity cluster of the plurality of entity clusters;
adding, to the synthetic profile the subset of items and a combination of variables associated with the subset of items; and
generating, for display on a client device, indications of the synthetic profile, the combination of variables, the current state characteristics of the entity, or a new entity variable associated with the current state characteristics of the entity.

5. The method of claim 4, further comprising:
receiving first time-series data for one or more items associated with the current state characteristics of the entity and second time-series data for the subset of items associated with the entity cluster of the plurality of entity clusters;
determining, a first set of future state variables for the one or more items associated with the current state characteristics;
determining, a second set of future state variables for the subset of items associated with the entity cluster of the plurality of entity clusters; and
generating for display one or more indications of the first set of future state variables and the second set of future state variables.

6. The method of claim 2, further comprising receiving the training dataset comprising a set of current state characteristics for a plurality of training entities, wherein the set of current state characteristics comprises the entity characteristics and item representations associated with each corresponding entity.

7. The method of claim 6, further comprising training, using the training dataset, the clustering machine learning model, wherein the clustering machine learning model is trained to classify the given entity based on a given entity's current state characteristics into the corresponding entity cluster of a plurality of entity clusters, and wherein each entity cluster within the plurality of entity clusters is defined by the corresponding set of current state characteristics.

8. The method of claim 6, further comprising:
adding, to the training dataset, item characteristics associated with corresponding items to generate an updated training dataset; and
training, using the updated training dataset, the profiling machine learning model to identify, for the given item characteristic set, the given plurality of items to be linked with the given entity cluster.

9. The method of claim 2, wherein identifying, within the entity dataset, the plurality of entities associated with the entity cluster comprises inputting the entity dataset and a plurality of candidate peer entity datasets into the peer identification machine learning model to identify the entity peers for the entity.

10. The method of claim 9, further comprising training the peer identification machine learning model by:
adding the plurality of peer group identifiers to the training dataset to generate the peer dataset, wherein each entry within the training dataset is associated with a corresponding entity and includes a corresponding peer group; and
inputting the peer dataset into the training routine of the peer identification machine learning model, wherein the peer identification machine learning model is trained to identify the entity peers for the given entity based on given current state characteristics of the given entity and corresponding current state characteristics for a candidate peer entity.

11. The method of claim 2, further comprising:
comparing entity characteristics of the entity with cluster characteristics of the entity cluster;
identifying one or more differences between the entity characteristics and the cluster characteristics; and
generating for display to the user one or more interactive indications of the one or more differences, wherein the user is enabled to change one or more cluster characteristics corresponding to the one or more differences.

12. The method of claim 11, further comprising:
based on user interaction with the one or more interactive indications, determining, using the clustering machine learning model, one or more different clusters associated with the user;
generating for display one or more of different sets of characteristics corresponding to the one or more different clusters; and
enabling the user to select a new entity cluster.

13. One or more non-transitory, machine-readable media, comprising instructions that, when executed by one or more processors, cause operations comprising:
receiving an entity dataset comprising a plurality of current state characteristics for an entity, wherein the plurality of current state characteristics comprises entity characteristics;
determining, for the entity using the plurality of current state characteristics as input into a clustering machine learning model comprising a convolutional neural network, an entity cluster within a plurality of entity clusters, wherein the convolutional neural network has been trained to classify the entity, based on an entity's current state characteristics, into the entity cluster of the plurality of entity clusters, and wherein the convolutional neural network has been trained using unsupervised learning and a training dataset, to classify a given entity, based on the given entity's current state characteristics, into a corresponding entity cluster of a plurality of entity clusters, and wherein each entity cluster within the plurality of entity clusters is defined by corresponding set of current state characteristics for that cluster;
identifying, using a peer identification machine learning model, a plurality of entities and a corresponding one or more items associated with the entity cluster, and wherein the peer identification machine learning model is trained identify entity peers for the given entity based on adding a plurality of peer group identifiers to the training dataset to generate a peer dataset and by inputting the peer dataset into a training routine of the peer identification machine learning model;
generating an item characteristic dataset based on the corresponding one or more items associated with each entity;
determining, for the entity cluster using the item characteristic dataset as input into a profiling machine learning model, a plurality of items, wherein the profiling machine learning model has been trained to identify, for a given item characteristic set, a given plurality of items; and providing to a user an indication of a predetermined output variable and an entity variable corresponding to a current set of items, wherein the predetermined output variable is determined based on item data within the plurality of items and the entity variable is determined based on current item data within the current set of items.

14. The one or more non-transitory, machine-readable media of claim 13, wherein the instructions further cause the one or more processors to perform operations comprising:

locating, within a database, one or more entries associated with the corresponding one or more items; and generating a plurality of fields for the plurality of current state characteristics, wherein the plurality of fields comprises a plurality of values for a plurality of item characteristics.

15. The one or more non-transitory, machine-readable media of claim 13, wherein the instructions for providing to the user the indication further cause the one or more processors to perform operations comprising:

generating a synthetic profile for the entity, wherein the synthetic profile comprises current state characteristics associated with the entity cluster of the plurality of entity clusters;

adding, to the synthetic profile a subset of items of the plurality of items and a combination of variables associated with the subset of items; and generating, for display on a client device, indications of the synthetic profile, the combination of variables, the current state characteristics of the entity, or a new entity variable associated with the current state characteristics of the entity.

16. The one or more non-transitory, machine-readable media of claim 15, wherein the instructions further cause the one or more processors to perform operations comprising:

receiving first time-series data for one or more items associated with the current state characteristics of the entity and second time-series data for the subset of items associated with the entity cluster of the plurality of entity clusters;

determining, a first set of future state variables for the one or more items associated with the current state characteristics;

determining, a second set of future state variables for a set of items associated with the entity cluster of the plurality of entity clusters; and generating for display one or more indications of the first set of future state variables and the second set of future state variables.

17. The one or more non-transitory, machine-readable media of claim 13, wherein the instructions further cause the one or more processors to receive the training dataset comprising a set of current state characteristics for a plurality of training entities, wherein the set of current state characteristics comprises the entity characteristics and item representations associated with each corresponding entity.

18. The one or more non-transitory, machine-readable media of claim 17, wherein the instructions further cause the one or more processors to train, using the training dataset, the clustering machine learning model, wherein the clustering machine learning model is trained to classify the given entity based on a given entity's current state characteristics into the corresponding entity cluster of a plurality of entity clusters, and wherein each entity cluster within the plurality of entity clusters is defined by the corresponding set of current state characteristics.

19. The one or more non-transitory, machine-readable media of claim 13, wherein the instructions further cause the one or more processors to identify, within the entity dataset, the plurality of entities associated with the entity cluster by inputting the entity dataset and a plurality of candidate peer entity datasets into the peer identification machine learning model to identify the entity peers for the entity.

20. The one or more non-transitory, machine-readable media of claim 19, wherein the instructions for training the peer identification machine learning model further cause the one or more processors to perform operations comprising:

adding the plurality of peer group identifiers to the training dataset to generate the peer dataset, wherein each entry within the training dataset is associated with a corresponding entity and includes a corresponding peer group; and inputting the peer dataset into the training routine of the peer identification machine learning model, wherein the peer identification machine learning model is trained to identify the entity peers for the given entity based on given current state characteristics of the given entity and corresponding current state characteristics for a candidate peer entity.

* * * * *